United States Patent [19]

Höfling et al.

[11] Patent Number: 5,161,896
[45] Date of Patent: Nov. 10, 1992

[54] ROLLING BEARING FOR LINEAR MOVEMENT

[75] Inventors: Rainer Höfling, Arnstein; Ernst Albert, Sand/Main; Günter Blaurock, Niederwerrn, all of Fed. Rep. of Germany

[73] Assignee: Deutsche Star GmbH, Schweinfurt, Fed. Rep. of Germany

[21] Appl. No.: 746,221

[22] Filed: Aug. 15, 1991

[30] Foreign Application Priority Data

Aug. 21, 1990 [DE] Fed. Rep. of Germany ....... 4026445
Dec. 21, 1990 [DE] Fed. Rep. of Germany ....... 4041269

[51] Int. Cl.⁵ .................................. F16C 31/06
[52] U.S. Cl. .................................. 384/8; 384/44
[58] Field of Search ............... 384/8, 99, 44, 43, 45; 464/168

[56] References Cited

U.S. PATENT DOCUMENTS

| | | |
|---|---|---|
| 3,560,061 | 2/1971 | Shaw, Jr. . |
| 4,504,097 | 3/1985 | Mottate . |
| 4,659,238 | 4/1987 | Teramachi . |
| 4,765,754 | 8/1988 | Slocum . |
| 4,953,988 | 9/1990 | Tsukada ................ 384/8 |
| 5,071,262 | 10/1991 | Monzel ................ 384/99 |

FOREIGN PATENT DOCUMENTS

| | | |
|---|---|---|
| 393201 | 10/1990 | European Pat. Off. . |
| 6033 | 11/1953 | Fed. Rep. of Germany . |
| 7149049 | 4/1972 | Fed. Rep. of Germany . |
| 7631363 | 1/1977 | Fed. Rep. of Germany . |
| 3140298 | 4/1983 | Fed. Rep. of Germany . |
| 3304895 | 10/1983 | Fed. Rep. of Germany . |
| 3438059 | 4/1986 | Fed. Rep. of Germany . |
| 3540099 | 5/1986 | Fed. Rep. of Germany . |
| 3617748 | 12/1986 | Fed. Rep. of Germany . |
| 3707342 | 9/1987 | Fed. Rep. of Germany . |
| 3616244 | 11/1987 | Fed. Rep. of Germany . |
| 3034008 | 12/1987 | Fed. Rep. of Germany . |
| 3429480 | 12/1987 | Fed. Rep. of Germany . |
| 3620571 | 12/1987 | Fed. Rep. of Germany . |
| 8714759 | 3/1988 | Fed. Rep. of Germany . |
| 3438596 | 4/1988 | Fed. Rep. of Germany . |
| 3417159 | 10/1988 | Fed. Rep. of Germany . |
| 3417160 | 10/1988 | Fed. Rep. of Germany . |
| 3725027 | 2/1989 | Fed. Rep. of Germany . |
| 8903980 | 6/1989 | Fed. Rep. of Germany . |
| 1-6412129 | 1/1989 | Japan . |
| 62169220 | 4/1989 | Japan . |

OTHER PUBLICATIONS

Ina-Walzlager "Stobdampfer For Werkzeugmasckinen", Nr. 24, Nov. 1987.
"Linearfuhrungen Im Wwerkzeugmaschinenbau", in Mashchinenelemente AGT 1/90, pp. 128-131. (no date).

Primary Examiner—Lenard A. Footland
Attorney, Agent, or Firm—Brumbaugh, Graves, Donohue & Raymond

[57] ABSTRACT

In a rolling bearing for linear movements, two rolling member circuits arranged between one arm of a U-shaped guide carriage and a lateral face of a guide rail, are substantially perpendicular to one another with their force transmission planes and are substantially parallel to one another with their circuit planes. All rollers have parallel axes in each of the two roller circuits. The load-transmitting row of rollers and the return row of rollers are offset from one another in the axial direction of the rollers in both roller circuits.

64 Claims, 12 Drawing Sheets

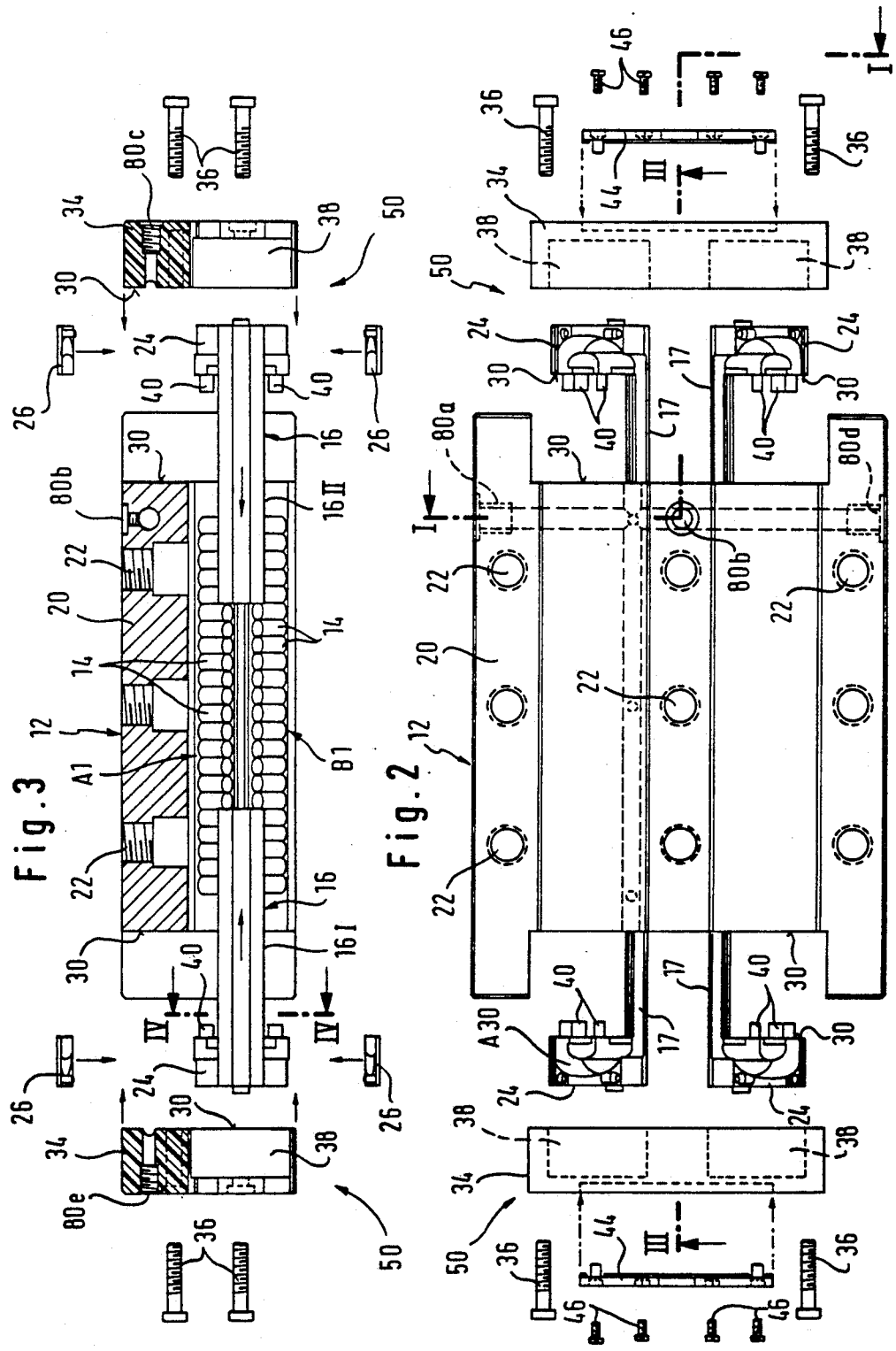

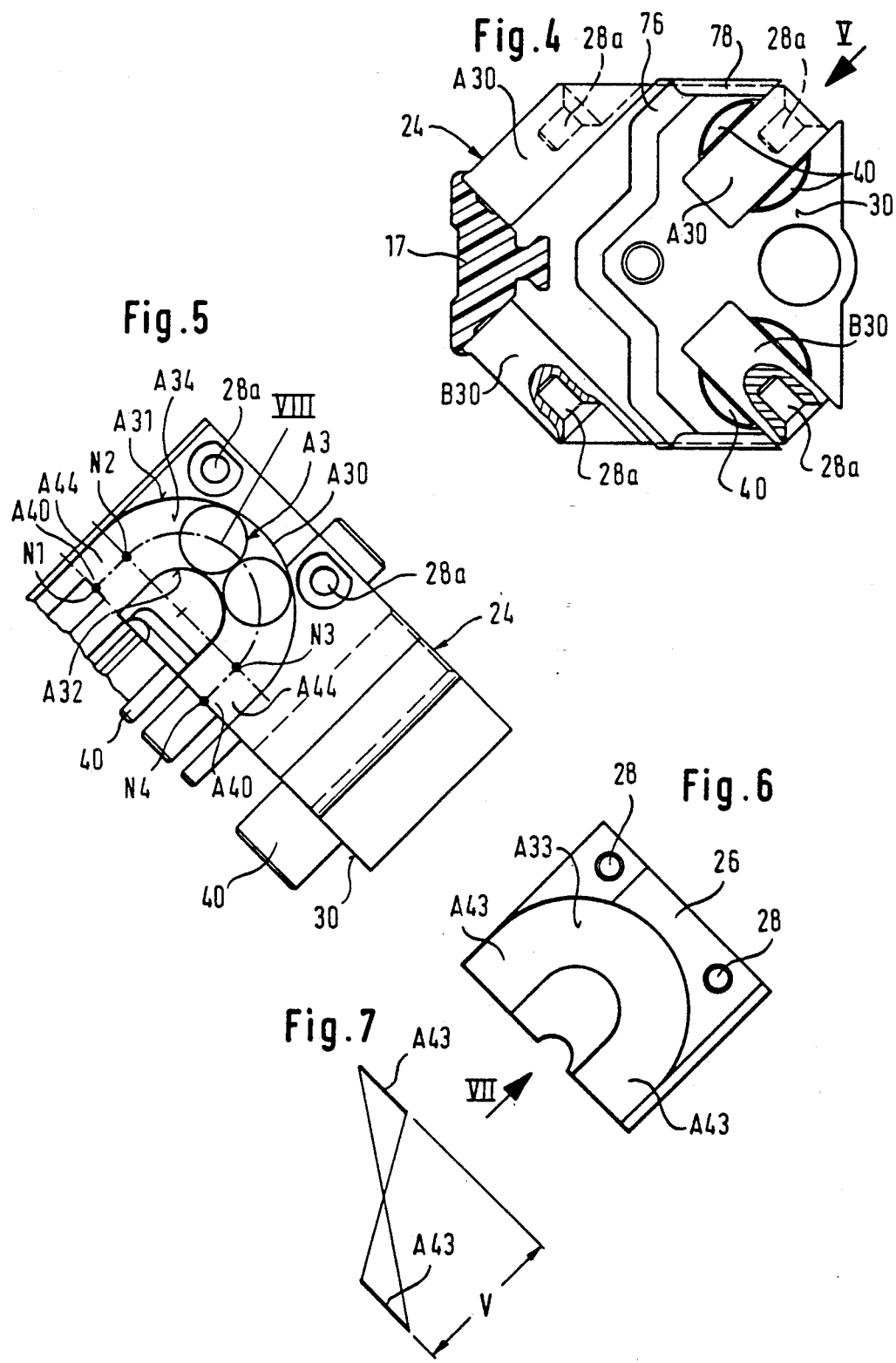

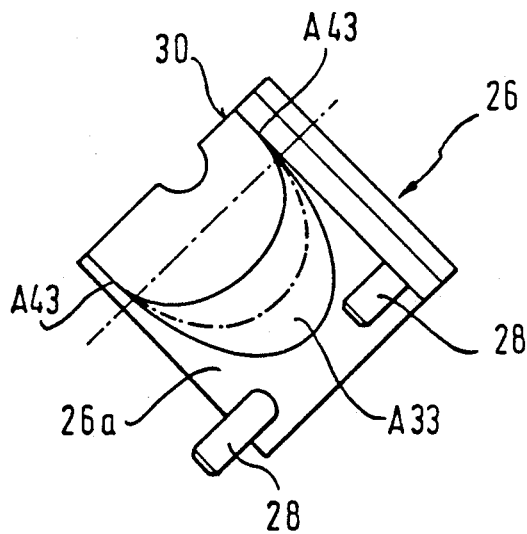
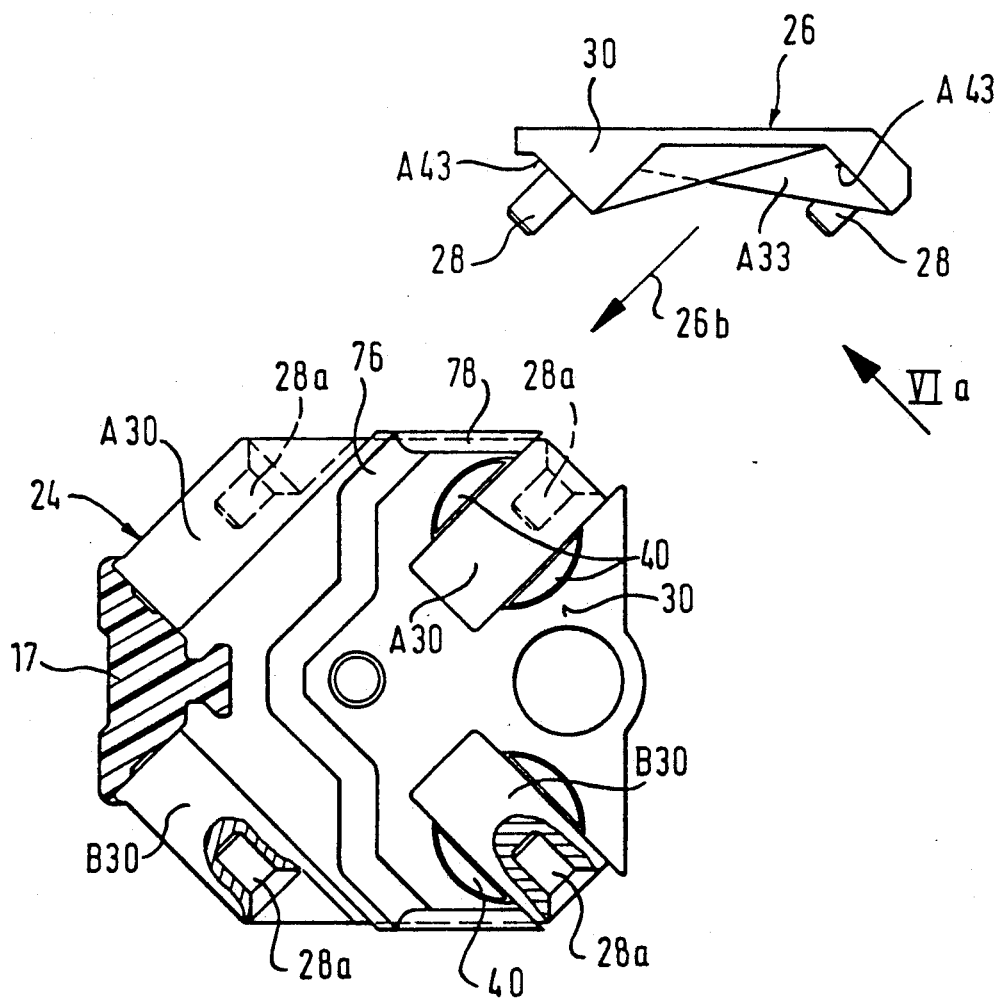

ROLLING BEARING FOR LINEAR MOVEMENT

BACKGROUND OF THE INVENTION

The invention relates to a rolling bearing for linear movements, comprising a guide rail with a longitudinal axis, two lateral faces, a top face and a centre plane between the two lateral faces, a U-shaped guide carriage with a web which extends parallel to a web plane and opposes the top face of the guide rail and with arms adjacent to the lateral faces of the guide rail, a plurality of rolling member circuits for guiding the guide carriage on the guide rail, wherein two rolling member circuits, namely roller circuits, are arranged on at least one side of the centre plane, wherein, moreover, each of the two roller circuits is constructed from rollers with a roller axis, with a roller peripheral surface, with axially spaced roller end faces and with a roller centre located on the roller axis in the centre between the two end faces, wherein, moreover, each roller circuit comprises a rectilinear load-transmitting row of rollers in engagement with a load-bearing track of the guide carriage parallel to the longitudinal axis of the guide rail and a load-bearing track of the guide rail parallel to the longitudinal axis of the guide rail, a substantially rectilinear return row of rollers in a return guide of the guide carriage and two curved rows of rollers in curved guides of the guide carriage, wherein, moreover, the roller axes of all rollers of each roller circuit are arranged parallel to one another, wherein, moreover, the two roller circuits each define a circuit plane which approximately contains the centres of the rollers of the load-transmitting row of rollers and the return row of rollers of the respective roller circuit, wherein, moreover, the rollers of the respective load-transmitting row of rollers of each roller circuit define a load-transmitting plane which is perpendicular to the roller axes of the rollers of the load-transmitting row of rollers and contains the centres of the rollers of this load-transmitting row of rollers, wherein, moreover, the circuit planes and the force transmitting planes of the two roller circuits are parallel to the longitudinal axis of the guide rail, wherein, moreover, the force transmitting planes of the load-transmitting rows of rollers of the two roller circuits together enclose a first angle and the circuit planes of the two roller circuits together enclose a second angle, wherein, moreover, the projections of the two roller circuits do not intersect in the direction of the longitudinal axis, wherein, moreover, the two roller circuits are superimposed perpendicularly to the web plane and wherein the return rows of rollers of the two roller circuits are more remote from the centre plane of the guide rail than the load-transmitting rows of rollers of the two roller circuits.

STATEMENT OF THE PRIOR ART

In a rolling bearing known from DE-OS 35 40 099 (see, for example, FIG. 18 thereof), two respective roller circuits are provided on either side of a guide rail, between this guide rail and a U-shaped guide carriage. All rollers have axes parallel to one another in all roller circuits. The rollers of the load-transmitting rows of rollers on one side of the guide rail form two force transmission planes which enclose an angle of about 90° The 90° angle is desirable because it gives the rolling bearing high resistance to tilting and torsional stresses about the longitudinal axis of the guide rail and ensures that the loadability is equal in all main directions. All rollers of each of these two roller circuits located on one side are each located in a circuit plane which coincides with the respective force transmission plane. The circuit planes of the two roller circuits located on one side of the guide rail also lie at an angle of 90° to one another If the load-bearing tracks of the two roller circuits located on one side of the guide rail are now located, as shown in FIG. 18 of DE-OS 35 40 099, such that these tracks diverge toward the centre plane of the guide rail, then the rows of return rollers of the two roller circuits are necessarily at substantially greater distances from one another than the load-transmitting rows of rollers with the result that the height of the guide carriage is greater than frequently desired.

It is known from U.S. Pat. No. 4,765,754, that, in a roller circuit, the rollers of the return row of rollers are offset from the rollers of the load-transmitting row of rollers in the direction of the roller axes of this roller circuit, relatively small individual offset distances also arising here between successive rollers of the curved rows of rollers and corresponding—when added over the respective curved row of rollers—to the offset distance between load-transmitting row of rollers and return row of rollers. However, this embodiment has not recognised the possibility of reducing the overall height in a guide rail with a U-shaped carriage by applying this measure.

It is known from DE-OS 37 07 342 to arrange the circuit planes of two roller circuits, located on one side of a guide rail, of a U-shaped guide carriage in circuit planes which are roughly parallel to one another and to the web plane of the guide carriage. However, the parallel position of all rollers of the individual roller circuits which is desirable for the running properties would have to be dispensed with.

It is known from DE-OS 36 20 571, more specifically from FIGS. 15 to 22 thereof, that the two roller circuits of a U-shaped guide carriage are arranged in an intersecting manner on one side of a guide rail, when viewed in the longitudinal direction of the guide rail. A relatively small overall height can also be achieved with this embodiment with rollers having axes which are consistently parallel in each roller circuit. However, the mechanical construction of such an arrangement is complicated greatly by the intersection of the roller circuits. Furthermore, the guide carriage is necessarily lengthened relative to the length of each single roller circuit so that an extension of the guide carriage without a simultaneous increase in the carrying capacity has to be allowed for or—in other words—a reduction in the carrying capacity has to be allowed for with a given length of the guide carriage.

In another embodiment also known from DE-OS 36 20 571 (see FIGS. 23 to 28 thereof), attempts have been made to superimpose the two roller circuits mounted on a U-shaped guide carriage on one side of the guide rail in two parallel circuit planes which are also parallel to the web plane and thus to achieve a small overall height. However, it was necessary to bear in mind that the successive rollers in the curved rows of rollers are each tilted relative to one another, i.e. no longer have parallel axes and therefore have substantially poorer running properties. In addition, the guidance of the rollers in the curved rows of rollers can only be provided by complicated guide elements in this embodiment.

OBJECT OF THE INVENTION

The object of the invention is to construct a rolling bearing of the type mentioned at the outset such that a lower overall height of the main bearing member can be achieved.

SUMMARY OF THE INVENTION

According to the invention a rolling bearing for linear movements comprises a guide rail with a longitudinal axis, two lateral faces, a top face and a centre plane between the two lateral faces. A U-shaped guide carriage has a web which extends parallel to a web plane and opposes the top face of the guide rail and further has arms adjacent to the lateral faces of the guide rail. A plurality of rolling member circuits is provided for guiding the guide carriage on the guide rail. Two rolling member circuits, namely roller circuits, are arranged on at least one side of the centre plane. Each of the two roller circuits is constructed from rollers with a roller axis, with a roller peripheral surface, with axially spaced roller end faces and with a roller centre located on the roller axis in the centre between the two end faces. Each roller circuit comprises a rectilinear load-transmitting row of rollers in engagement with a load-bearing track of the guide carriage parallel to the longitudinal axis of the guide rail and a load-bearing track of the guide rail parallel to the longitudinal axis of the guide rail, a substantially rectilinear return row of rollers in a return guide of the guide carriage and two curved rows of rollers in curved guides of the guide carriage. The roller axes of all rollers of each roller circuit are arranged parallel to one another. The two roller circuits each define a circuit plane which approximately contains the centres of the rollers of the load-transmitting row of rollers and the return row of rollers of the respective roller circuit. The rollers of the respective load-transmitting row of rollers of each roller circuit define a load-transmitting plane which is perpendicular to the roller axes of the rollers of the load-transmitting row of rollers and contains the centres of the rollers of this load-transmitting row of rollers. The circuit planes and the force transmitting planes of the two roller circuits are parallel to the longitudinal axis of the guide rail. The force transmitting planes of the load-transmitting rows of rollers of the two roller circuits together enclose a first angle and the circuit planes of the two roller circuits together enclose a second angle. The projections of the two roller circuits do not intersect in the direction of the longitudinal axis. The two roller circuits are superimposed perpendicularly to the web plane. The return rows of rollers of the two roller circuits are more remote from the centre plane of the guide rail than the load-transmitting rows of the rollers of the two roller circuits. In each of the roller circuits, the rollers of the return row of rollers are offset from the rollers of the load-transmitting row of rollers in the direction of the roller axes of the respective roller circuit by a respective offset distance. Successive rollers of the two curved rows of rollers of the respective roller circuit are offset from one another by respective individual offset distances in the direction of the respective roller axes. The sum of the individual offset distances formed over the respective curved row of rollers corresponds to the respective offset distance. The offset direction of the return rows of rollers relative to the load-transmitting rows of rollers of the two roller circuits is selected such that the second angle is smaller than the first angle.

The construction according to the invention of a rolling bearing can be used regardless of whether the load-bearing tracks located on one side of a guide rail converge or diverge toward the centre plane. In the first case, the invention permits the load-transmitting rows of rollers to be approached close together, and in the latter case, it permits the return rows of rollers to be approached close together. The possibility of reducing the overall height arises in both cases.

Since all rollers have parallel axes in each roller circuit in the rolling bearing according to the invention, optimum running properties are produced for the roller circuits, as known from DE-OS 35 40 099.

Since the projections of the two roller circuits are free from intersections on one side of the guide rail, the length dimensions of the two roller circuits can be equal, as also known from DE-OS 35 40 099, so that a specific required load-bearing capacity of the rolling bearing can be achieved with minimum axial length of the guide carriage.

Minimum overall height of the guide carriage can also be achieved if the angle enclosed by the circuit planes of the two roller circuits is zero. The load-transmitting rows of rollers of the two roller circuits can then be superimposed perpendicularly to the web plane, and the return rows of rollers of the two roller circuits can also be superimposed perpendicularly to the web plane so that the overall construction of the guide carriage is particularly compact.

To obtain optimum load-bearing capacities relative to tilting and torsional stresses and normal stresses in all main directions of the guide carriage relative to the guide rail it is proposed that the force transmission planes of the load-transmitting rows of rollers of the two roller circuits enclose a first angle of about 90° with one another, as known from FIG. 18 of DE-OS 35 40 099.

The invention is applicable, in particular, if two respective roller circuits are arranged on either side of the centre plane, as also known from DE-OS 35 40 099. It is possible to arrange the roller circuits substantially symmetrically to one another with respect to the centre plane on either side of the centre plane.

For the geometric structure of the curved guides, the return guide and the guide of the load-transmitting row of rollers, a construction can be selected with the design according to the invention which is such that the arc guide of a curved row of rollers is constructed with at least one inner curved roller track adjacent to the peripheral roller surfaces of this curved row of rollers, at least one outer curved roller track adjacent to the peripheral roller surfaces of this curved row of rollers and two curved roller support webs opposing the roller end faces of this curved row of rollers, such that the return guide of the associated return row of rollers is constructed with at least one inner return roller track adjacent to the peripheral roller surfaces of this returning row of rollers, at least one outer return roller track adjacent to the peripheral roller surfaces of this returning row of rollers and with return roller support webs opposing the roller end faces of this returning row of rollers, such that load roller support webs oppose the roller end faces of the associated load-transmitting row of rollers, such that the inner curved roller track is adjacent to the load-bearing track of the guide carriage and to the inner return roller track, such that the outer curved roller track is adjacent to the load-bearing track of the guide rail and to the outer return roller track and such that each of the curved roller support webs is adjacent to one respective return roller support web and one respective load roller support web. To simplify production of the rolling bearing, it is proposed that at least one rectilinear load-transmitting row of rollers and the associated substantially rectilinear return row of rollers be arranged in a main member unit of the guide carriage and that at least one associated curved guide be formed in one end unit of the guide carriage It is advisable to connect the end unit to the main member unit in a parting plane substantially perpendicular to the longitudinal axis.

An end unit of the guide carriage can be produced simply in that the end unit has a base member and a covering member, one of the curved roller support webs and at least part of the curved roller tracks being formed in the base member and at least the second curved roller support web being formed on the covering member. In this embodiment, the curved roller tracks and one curved roller support web can be produced simply in the base member with an end-milling cutter guided, for example, over an arc-shaped line. If the base member is to be produced by a casting or injection moulding process, for example from plastics material or light metal, removal from the mould is not problematic. The second curved roller support web can be produced in an equally simple manner on the covering member. The introduction of the rollers into the respective roller circuit becomes particularly simple because the base member can initially be mounted on the bearing main member and all rollers can then be introduced axially in the region of the still open base member (axially denotes in the direction of the roller axis) and, in the final analysis, it is only necessary to place the covering member onto the base member.

A further constructional simplification is achieved in that a base member of the end unit is common to two curved guides and a covering member is fixed on the common base member for each curved guide.

To ensure that the rollers of a roller circuit run with as little resistance and noise as possible, it is proposed that transition support web portions tangentially follow the curved roller support webs, these transition support web portions tangentially following the associated return roller support webs and the associated load roller support webs and being arranged inside the end unit. If the transition support web portions are shifted into the end part, this is because exclusively straight tracks and support webs have to be produced in the region of the main bearing member for reasons of production. The transition support web portions can basically be provided inside the, for example, semicircular curved course of the curved guides. However, the curved guides can be extended at both ends in an end unit such that, in the extensions, the track portions adjacent to the peripheral surfaces of the rollers are parallel in area to the load-bearing tracks of the guide rail and of the guide carriage and are parallel to the return roller tracks and can position the transition support web portions in the region of these extensions.

Optimum running properties are achieved if a continuous transition from the curved roller support webs and the load roller support webs is guaranteed and if, on the other hand, the roller centres of all rollers of the respective curved row of rollers are also located as close as possible to the circuit plane of the respective roller circuit.

To enable the rollers to be mounted in the guide carriage in the state of separation from the guide rail, it is proposed that at least one of the load roller support webs embraces the peripheral surfaces of the rollers of a load-transmitting row of rollers such that the rollers of the load-transmitting row of rollers are permanently secured on the guide carriage when the guide rail and guide carriage are separated.

In order further to simplify production of the guide carriage, it is proposed that adjacent load roller support webs of two roller circuits are formed by a support strip arrangement common to them. In this case, only two of the total of four load roller guide webs of the two roller circuits provided on one side of the guide rail have to be mounted on the main bearing member of the guide carriage, while the two other load roller support webs can be formed on the support strip arrangement which is to be produced separately.

A particularly advantageous embodiment is achieved if adjacent load roller support webs of two roller circuits are formed by a support strip arrangement common to them and in that this support strip arrangement is formed by two support strips divided in the longitudinal centre of the main member unit, each of which is produced integrally with a part of an end unit. In this embodiment, the end units are identical to the support strip portion shaped integrally thereon in each case, at least if the guide carriage is symmetrical with respect to the longitudinal centre plane, so that the number of different components of the rolling bearing to be produced is reduced.

The load-bearing tracks can basically be formed on the main bearing member itself. However, it may be advantageous under certain circumstances if the load-bearing track of at least one roller circuit is formed by an insert in the guide carriage. One advantage is that higher quality materials than for the guide carriage itself can be used for the insert with relatively low costs A further advantage is that the contact conditions between peripheral roller surfaces and load-bearing tracks can be improved in that the insert is mounted so as to swing about a swing pin on the guide carriage parallel to the longitudinal axis of the guide rail.

Low-friction fitting of an insert round the swing axis can be obtained in that the insert has a convex bearing surface which engages in a concave bearing surface of the guide carriage, particularly if the convex bearing surface has a smaller radius of curvature than the concave bearing surface.

To enable an insert to be kept substantially in its operating position using simple means, before the rollers are introduced into the guide carriage, it is proposed that the insert engages at least at one end in a recess in an end unit of the guide carriage mounted at the end of a main member unit of the guide carriage. The engagement of the insert end into the end unit must allow sufficient play of the insert relative to the guide carriage in the direction of rotation round the swing axis for the insert to position itself after introduction of the rollers in a swinging manner parallel to their peripheral surfaces.

According to a further feature of the invention, it is proposed that at least one return guide is formed by a cylindrical bore in the guide carriage which is widened at two diametrally opposed peripheral regions by substantially rectangular niches, the diameter of the bore being greater than the diameter of the rollers and smaller than the axial length of the rollers and the niches adjoining the end faces of the rollers and end portions of the peripheral surfaces of the rollers. This design of the return guide can be produced simply in that the rectangular niches are produced from the bore out, for example by broaching, after boring the cylindrical bore. The prior art concerning this feature can be found in US-PS 4,504,097. The return duct is also formed there, emanating from a cylindrical bore, four triangular niches being formed in the peripheral walls of the cylindrical bore. In this embodiment, the diameter of the bore is greater than the diameter of the rollers and greater than the axial length of the rollers.

Special protection is sought for the configuration according to the invention proposed here of the return guide, independently of the design according to claim 1. For producing the transition between the curved guide and the return guide, the end unit can be provided, in one end region of the curved guide, with circular segment-shaped projections which engage a short distance into the bore of the return guide, if the guide carriage is designed with a main member unit and an end unit having the curved guide.

Another possible method of creating a return guide suitable for rollers, with low production costs, resides in the fact that at least one return guide is formed by a guide lining in a duct of the guide carriage It is also advisable here to construct the duct as a circular cylindrical bore. The guide lining can be produced from plastics material. The state of the art concerning this solution is found in DE-OS 35 40 099.

If the guide carriage is designed with a main member unit and at least one end unit mounted on one end of the main member unit, at least a proportion of the guide lining can be constructed integrally with a part of the end unit, for example such that each end unit is connected, at both ends of the main member unit, to a piece of the guide lining which is divided in the longitudinal direction, preferably in the central region of its length.

Production of the guide lining can be simplified in that the guide lining is divided in its longitudinal direction, i.e. consists of two shells which are joined together before or during insertion into the duct. This method of producing the guide lining is advantageous in terms of production, particularly if the guide lining is joined to part of an end unit.

Protection which is independent from the feature group of claim 1 is sought for the design of the guide lining as a constituent of an end unit and for the production of a guide lining from two partial shells which are assembled in a longitudinal plane.

It has already been pointed out in the foregoing that support strips can also be formed integrally with parts of the end unit. In a preferred embodiment, both a support strip and the guide linings for the return guides of two roller circuits are mounted on a base member of an end unit, or at least one partial shell of these guide linings in each case. The number of parts required for constructing the rolling bearing is reduced in this way. Protection which is independent of the features of claim 1 is also sought for this particularly advantageous configuration.

If a base member with two covering members is mounted on one end of the main member unit, the constructional group formed from base member and covering member can be embraced by a terminal plate mounted on the main member unit of the guide carriage, preferably a terminal plate with chambers in which the base member and the covering member are received. It is basically possible to place such a terminal plate over base member and covering member, even if two base members with one respective covering member are provided for the two roller circuits The terminal plate can serve, on the one hand, for securely holding the covering member on the respective base member so that it is sufficient to join together covering member and base member merely by positioning pegs and to leave the rest of cohesion to the terminal plate. On the other hand, the terminal plate gives the end unit a compact appearance in that it covers the abutting faces between base member and covering member.

Protection which is independent from the subject of claim 1 is also sought for the idea of the terminal plate embracing the base member and covering member If the rolling bearing is constructed with two respective roller circuits on either side of the guide rail, the terminal plate can preferably be formed such that it jointly covers a respective base member and two associated covering members on either side of the centre plane. It is also conceivable to mount the curved guides of four roller circuits in a base member of an end unit and accordingly to allocate four covering members to this one base member To simplify production of the base member, however, the possibility of providing two separate base members with two respective covers at the end of a main member unit with four roller circuits is preferred, in which case the terminal plate embraces the two base members and the covering members thereof and covers all partition faces between base member and covering member.

The terminal plate can be used as a suitable carrier for a sealing plate adapted to the profile of the guide rail. In view of its sealing function, the sealing plate for the entire profile of the guide rail is constructed in one piece.

In order to encapsulate the roller space so that it is tight to external lubricants, it is proposed that sealing plates mounted at the two ends of the guide carriage follow each longitudinal sealing strip of the guide carriage on both lateral faces of the guide rail.

In order completely or substantially to eliminate vibrations of the guide carriage relative to the guide rail, a lubricant cushion, in particular an oil cushion, can be provided between at least one of the top face and the lateral faces of the guide rail, on the one hand, and a face of the guide carriage opposing it at a short distance, on the other hand. The lubricant cushion will preferably be arranged between those faces of the guide rail and of the guide carriage which lie perpendicularly to the directions in which vibrations must be expected The distance between the faces which limit the lubricant cushion between themselves will preferably be approximately from a few $\mu$ to about 100 $\mu$, preferably between about 5 $\mu$ and about 40 $\mu$. The lubricant cushion will preferably be constructed as a lubricating oil cushion because, in the case of a lubricating oil cushion, close contact between the lubricating oil and the faces limiting the cushion is invariably guaranteed even during operation, particularly if the lubricating oil of the lubricant cushion is kept under pressure by a lubricating oil source kept under pressure externally With regard to the state of the art concerning the lubricant cushion, reference is made to German Gebrauchsmuster No. 89 03 980, which proposes that a separate damping element in which the lubricant cushions are formed is arranged between two guide carriages on the guide rail. However, the idea of arranging the lubricant cushions in a guide carriage also containing rolling member circuits cannot be inferred from this document. Protection which is independent from the subject of claim 1 is also sought for this idea As the roller circuits generally require constant lubrication, it is proposed, for simplification, that the lubricant cushion be attached to a lubricant supply system which also serves to supply at least one roller circuit with lubricant.

To enable the lubricant supply to be attached to the most desirable position in each case, depending on the installation conditions of the rolling bearing in a superior construction, it is proposed that the lubricant supply system has a plurality of lubricant connections which can be attached selectively to an external lubricant source.

The various features of the invention are discussed especially in the accompanying claims which form a part of the disclosure.

For the best understanding of the invention, its working advantages and specific effects, reference is now made to the accompanying drawings and the description in which preferred embodiments of the invention are discussed.

BRIEF DESCRIPTION OF THE DRAWINGS

The invention will be described in greater detail below by reference to the forms of embodiment as represented in the drawings, wherein:

FIG. 2 shows an exploded plan view of the guide carriage of the rolling bearing in the direction of the arrow II in FIG. 1.

FIG. 3 shows a section along line III—III in FIG. 2.

FIG. 4 shows a section along line IV—IV in FIG. 3;

FIG. 4a shows a section according to FIG. 4 together with a matching covering member.

FIG. 5 shows a view in the direction of the arrow V in FIG. 4.

FIG. 6 shows the view of a covering member from below, which can be assembled with the base member shown in FIG. 5.

FIG. 6a shows a view in the direction of the arrow VIa in FIG. b;

FIG. 7 shows a schematic view of FIG. 6 in the direction of the arrow VII in FIG. 6.

DESCRIPTION OF PREFERRED EMBODIMENTS

Figure 1:
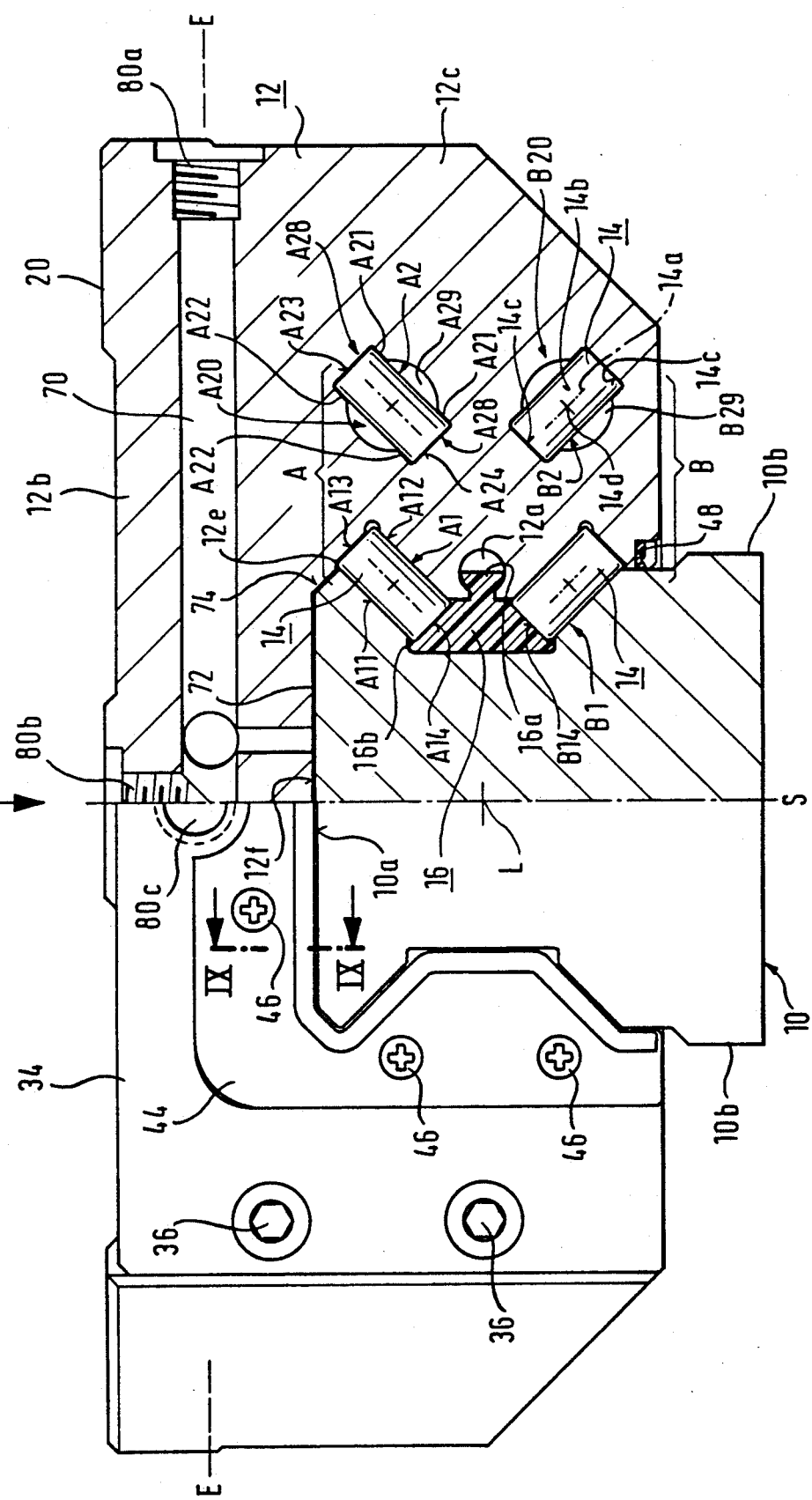
FIG. 1 shows a section which is orthogonal to the axis of the guide rail, through a rolling bearing according to the invention.

In FIG. 1, 10 denotes a guide rail having a top face 10a and lateral faces 10b. The guide rail is symmetrical with respect to a centre plane S. A guide carriage 12 is guided perpendicularly to the plane of the drawing in FIG. 1 on the guide rail 10. The guide carriage is also symmetrical with respect to the centre plane S. This axis of the rail is designated by L.

The guide carriage 12 is guided on the guide rail 10 by means of a total of four roller circuits, of which two are shown in the right-hand half of FIG. 1 and are designated with A and B. The roller circuit A is described in detail hereinafter. Since the roller circuit B corresponds to the roller circuit A, roller circuit 8 will not be described in detail. The individual elements of the roller circuit A are designated by A1, A2 etc. Corresponding reference numerals Bx, By etc. are used for the individual elements of the roller circuit B. The rollers of the roller circuits are designated by 14. These rollers 14 have a roller axis 14a, a peripheral surface 14b and two respective end faces 14c and a centre 14d.

The roller circuit A consists of a plurality of rollers 14 which are all arranged with parallel axes The roller circuit A comprises a load-transmitting rectilinear row of rollers A1 and a return, substantially rectilinear return row of rollers A2. The rollers of the load-transmitting row of rollers A1 rest on the guide rail 10 in a load-bearing roller track A11 and the guide carriage 12 in a load-bearing roller track A12, i.e. the peripheral surface 14b rests on the load-bearing tracks A11 and A12. The end faces 14c of the rollers of the load-transmitting row of rollers A1 rest on two load roller support webs A13 and A14. The load roller support web A13 is arranged directly on the guide carriage 12, while the load roller support web A14 is mounted on a support strip arrangement 16 which, in turn, is fixed on the guide carriage 12, more specifically in that it engages with a fixing part 16a in an undercut groove 12a of the guide carriage 12.

The guide carriage 12 consists of a web part 12b with a web plane E and two arms 12c. The roller circuit A also comprises curved rows of rollers A3 at both ends of the running carriage, one of which is indicated in FIG. 5 by two rollers. The curved row of rollers A3 is guided by an outer curved roller track A31 and an inner curved roller track A32, which both rest on the peripheral faces 14b of the respective rollers. The rollers of the curved row of rollers A3 are also supported by curved roller support webs A34 and A33 which rest on the end faces 14c. The rollers of the rectilinear return row of rollers A2 are guided in a return guide A20 formed by a bore A29 with adjacent rectangular niches A28. Internal return roller tracks A22 and external return roller tracks A21 are formed by the niches A28, and also return roller support webs A23 and A24.

The external curved roller track A31 tangentially follows the load-bearing roller track A11 of the guide rail 10 and the external return roller tracks A21. The internal curved roller track A32 tangentially follows the load-bearing roller track A12 of the guide carriage 12 and the internal return roller tracks A22 of the return guide A20. The curved roller support web A34 follows, with a continuous transition, the load roller support web A14 of the support strip arrangement 16 and the return roller support web A24 of the return guide A20. The curved roller support web A33 continuously follows the load roller support web A13 and the return roller support web A23.

Figure 1A:
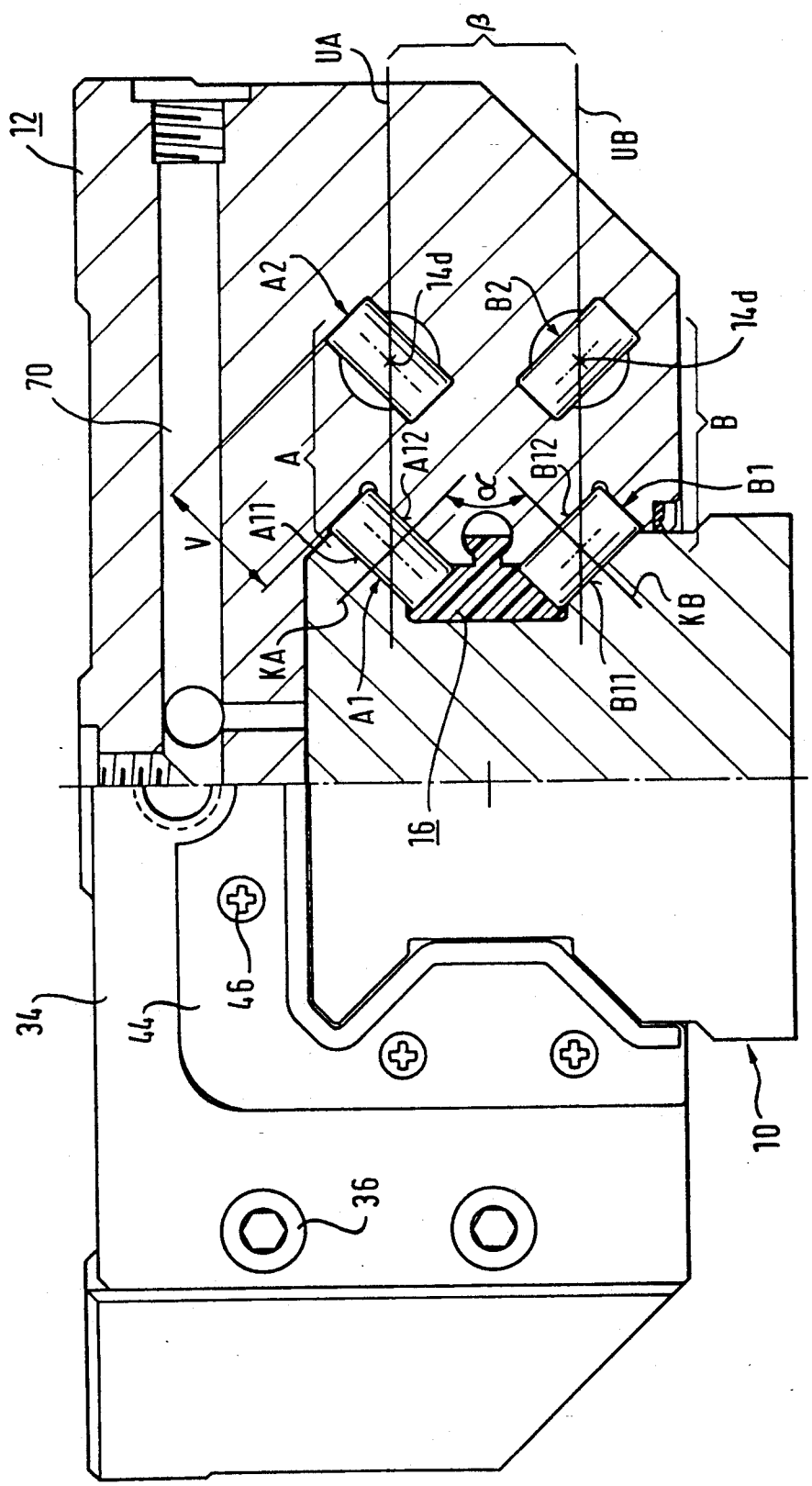
FIG. 1a shows the same section as FIG. 1 with further details concerning the geometry of the roller circuits.

In FIG. 1a, the force transmission planes of the roller circuits A and B are designated by KA and KB. The circuit webs UA and UB of the two roller circuits A and 8 are also indicated in FIG. 1A. The force transmission plane KA is perpendicular to the two load-bearing roller tracks A11 and A12 while the force transmission plane KB is perpendicular to the load-bearing roller tracks B11 and B12 The circuit plane UA contains the roller centres 14d of the load-transmitting row of rollers A1 and the return row of rollers A2, while the circuit plane UB contains the roller centres 14d of the load-transmitting row of rollers B1 and the return row of rollers B2. The centres of the curved rows of rollers A3 are located close to the circuit planes.

FIG. 1a shows that the force transmission planes KA, KB enclose an angle $\alpha$ of about 90° and that the circuit planes UA and UB enclose an angle $\beta$ of approximately zero degrees.

Figure 8:
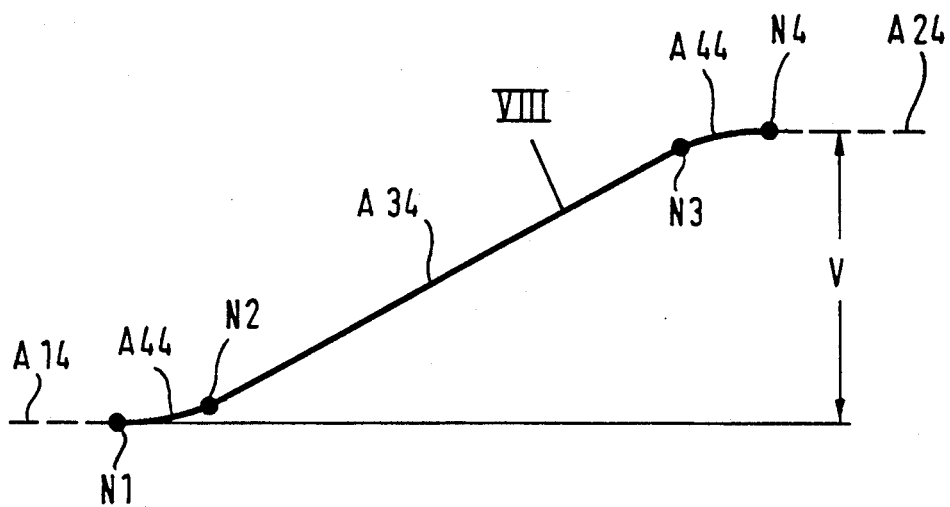
FIG. 8 shows the development of a curved roller support web according to line VIII in FIG. 5.

The load-transmitting row of rollers Al is offset toward the roller axes by the amount V, as shown in FIG. 1a. According to this amount V, the curved roller support webs A33 and A34 rise substantially continuously between the load-transmitting row of rollers A1 and the return row of rollers A2, as shown in FIG. 8, where the centre line VIII of the curved roller support web A34 is developed.

FIG. 7 shows schematically the helical course of the curved roller support web A33. The course of the curved roller support web A34 is correspondingly helical.

The webs A31, A32, A33 and A34 form a curved guide A30. It can be seen that this curved guide A30 has a circular course, when observed in the axial direction of the rollers, (FIG. 5) and that transition portions A40 of the curved guide A30 follow this circular course, transition support web portions A44 existing in these transition portions and—as shown in FIG. 8—tangentially following the curved roller support web A34, the load roller support web A14 and the return roller support web A24.

Level points on line VIII at the respective beginning and end of the support web portions A44 are designated by N1, N2, N3 and N4. Corresponding support web portions A43 at the ends of the curved roller support web A33 are indicated in FIG. 7.

It can be seen from FIGS. 2 and 3 that the guide carriage 12 comprises a main member 20 with bores 22, for example for fixing a machine tool carriage to be guided linearly.

The support strip arrangement 16 is formed by two support strip portions 17. Each support strip portion 17 is connected to a base member 24 which - as shown in FIG. 4 - receives two curved guides A30 and B30 and is connected integrally to the support strip portion 17. The base member 24 and the support strip portion 17 are injection moulded from plastics material while the main bearing member is worked from metal. The curved roller guides A30 and B30 are worked into the base member so as to simplify release from the mould when they are produced by injection moulding or casting. The base member 24 is covered by two covering members 26, as shown in the FIGS. 4a, 6 and 6a. The curved roller support webs A33 are mounted on the covering members 26. The covering members 26 are provided with positioning pegs 28 which are inserted into positioning holes 28a in the base member 24. The base member 24 lies in a partition plane 30 on the main bearing member 20. As shown in FIG. 2, a base member 24 with two covering members 26 is provided on each of the support strip portions 17 on the basis of the symmetrical arrangement according to FIGS. 1 and 1a. The covering members 26 are fixed at the base member 24 and rest against the base member 24 with abutment faces 26a.

The base members 24 provided with the covering members 26 are embraced by terminal plates 34 which also rest in the partition faces 30 on the main bearing member 20 and are fixed on the main bearing member by bolts 36. Chambers 38 are constructed in the terminal plates 34 and each receive a base member 24 with two covering members 26 and embrace them positively such that the covering members 26 are fixed on the base members 24. Circular segment shaped projections 40 which engage in the bores receiving return guides, for example A29 and 829 in FIG. 1, engage on the base members 24 and allow passage for the rollers 14 between them. Exact connection of the curved guides to the return guides is ensured in this way.

FIGS. 1 and 2 show that sealing plates 44 are fixed on the terminal plates 34, more specifically by bolts 46 These sealing plates 44 follow the contour of the guide rail 10 according to FIG. 1 and abut against the ends of longitudinal sealing strips 48 extending in the longitudinal direction of the guide rail.

Figure 9:
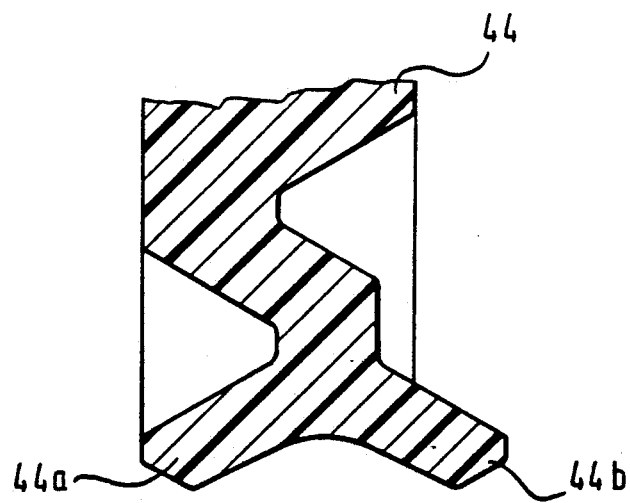
FIG. 9 shows a section along line IX—IX in FIG. 1.

FIGS. 2 and 3 show that, in each case, two base members 24 with two covering members 26 and one terminal plate 34 and one sealing plate 44 respectively form an end unit 50. The profile of the sealing plate 44 for contact on the guide rail 10 is shown in FIG. 9. It can be seen that two contact tongues 44a, 44b are provided. The sealing plate 44 can be composed in its entirety of sealing material or of a harder material with an embedded sealing strip.

It should be added, with regard to FIG. 1, that the rollers of the load-transmitting rows of rollers Al and B1—as shown in FIGS. 1 and 1a—are embraced by holding profiles 16b and 12e of the support strip arrangement 16 or the guide carriage 12 so that the rollers 14 are permanently held on the guide carriage 12 even if the guide carriage 12 is separated from the guide rail 10.

Figure 10:
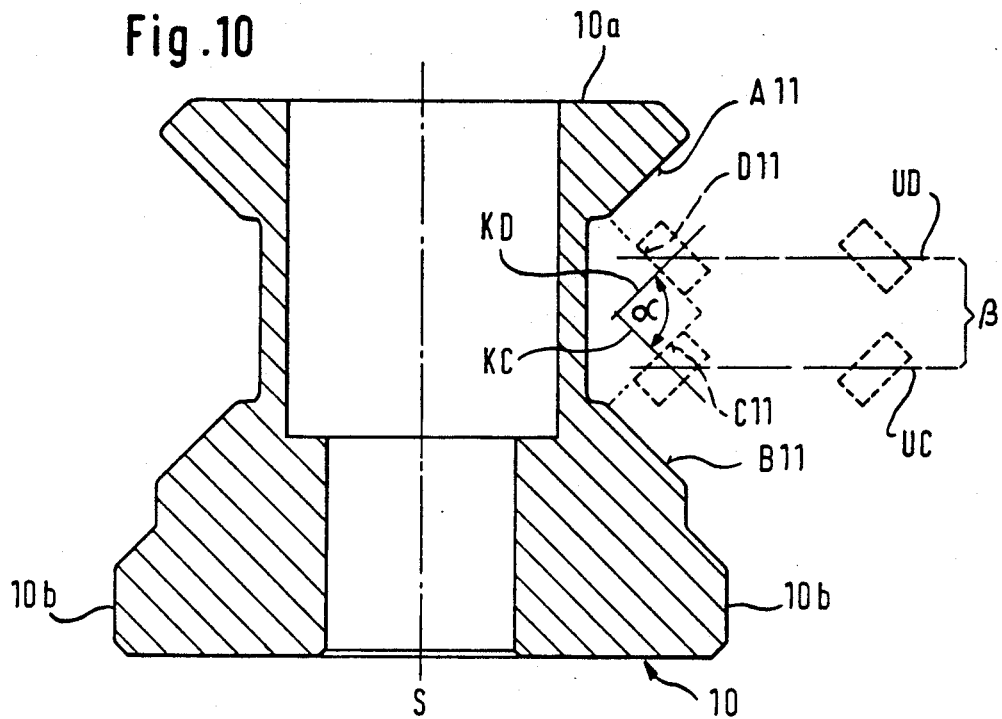
FIG. 10 shows a section which is normal to the axis through the guide rail.

FIG. 10 shows the profile of a guide rail 10 with the top face 10a, the lateral faces 10b and the load bearing roller tracks A11 and B11. The tracks A11 and B11 converge to the centre plane S. However, it would also be basically possible, to shape two load-bearing roller tracks C11 and D11 on the guide rail 10, as shown in broken lines in FIG. 10, which would then obviously necessitate reconstruction of the guide carriage. However, it should be borne in mind that, in this case too, the circuit planes UD and UC enclose the angle zero and the force transmission planes KC and KD again enclose an angle $\alpha$ of 90° so that the angle condition that B is smaller than $\alpha$ is again fulfilled here The embodiment shown in FIGS. 11, 12 and 13 corresponds, with respect to the geometry of the roller circuits, to the embodiment according to FIGS. 1 to 9. In contrast to the embodiment according to FIGS. 1 to 9, the load-bearing roller tracks A12 and B12 in this embodiment are not formed directly on the material of the guide carriage 112 but on inserts 152 which, with convex bearing faces 154 in concave bearing faces 156 of the guide carriage 112 are mounted in a swinging manner round swing axes 158 so that the load-bearing tracks A12 and B12 are inevitably adjusted parallel to the load-bearing roller tracks A11 and B11 of the guide rail 110 and so that the rollers 14 rest on their peripheral surfaces substantially over the entire length.

Figure 13:
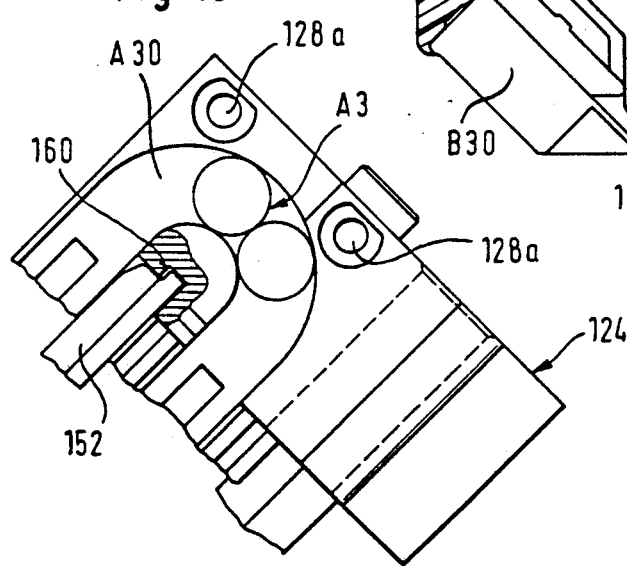
FIG. 13 shows a view in the direction of the arrow XIII in FIG. 12.

The inserts 152 engage—as shown in FIG. 13—in recesses 160 in the base member 124 with swing clearance so that the inserts 152 are held on the guide carriage 112 before introduction of the rollers 14.

Figure 11:
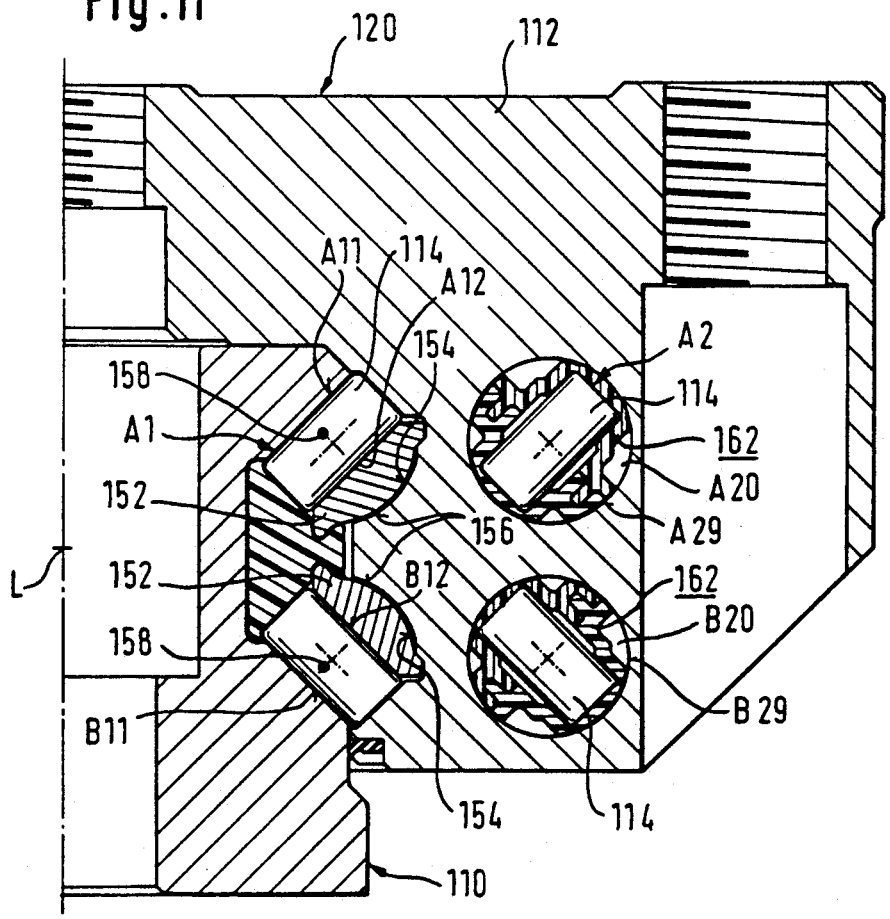
FIG. 11 shows a section corresponding to that in FIG. 1 in a modified embodiment of the invention.
Figure 12:
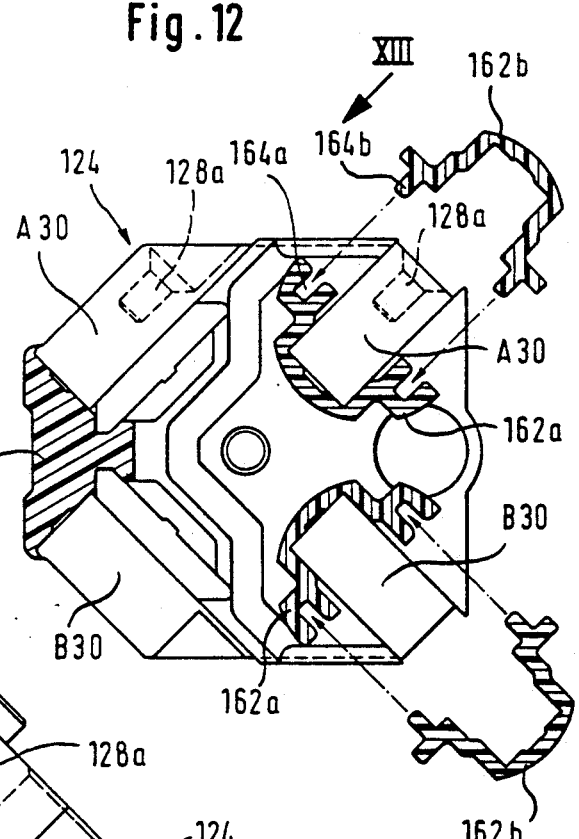
FIG. 12 shows a section corresponding to that in FIG. 4 in a modified embodiment according to FIG. 11.

Also in contrast to embodiments 1 to 9, the return guides A20 and B20 in the embodiment according to FIGS. 11 to 13 are formed in bores A29 and B29 which completely surround the rollers 114 and receive guide linings 162. As shown in FIG. 12, the guide linings 162 consist of partial shells 162a and 162b. The partial shells 162a are shaped integrally on the base members 124 and each extend over half the length of the main member 120. The partial shell 162b, on the other hand, extends over the entire length of the main member 120. The partial shells 162a and 162b can be positively assembled by means of plug-in strips 164b and plug-in grooves 164a.

The design of the return guides A20 is not linked to the presence of an insert 152. The insert 152 could also be used in the embodiment according to FIGS. 1 to 9 in conjunction with the return guides A20 shown therein. The return guide according to FIGS. 11 to 13 could also be used in the embodiment according to FIGS. 1 to 9, while maintaining the construction of the load-bearing track A12 therein.

The rollers are introduced once the base members 24 according to FIG. 2 rest on the partition face 30 and before the covering member 26 is placed onto the base members 24. The terminal plates 34 are then mounted.

According to FIG. 1, the main member 20 is constructed with a lubricating oil supply system 70 (FIG. 1). Owing to this lubricating oil supply system, an oil cushion 72 can be obtained between the head face 10a and the opposing face 12f of the guide carriage 12. This lubricating oil cushion ensures that vertical vibrations are dampened in the embodiment according to FIG. 1. According to FIG. 1, the lubricating oil cushion can also be maintained in a gap 74 so that horizontal vibrations are also dampened in FIG. 1. The gaps receiving the lubricating oil cushions can be adjusted to a gap width of 5 $\mu$ to 100$\mu$.

Lubricating oil lines 76 and 78, which serve to supply the roller circuits with lubricating oil, also follow the lubricating oil supply system 70 The lubricating oil supply system is provided with a plurality of junctions 80a, 80b, 80c, 80d and 80e so that the lubricating oil supply can be connected optimally depending on the installation conditions (FIG. 2).

The ratio of the roller length to the roller diameter is preferably equal to or greater than 1.3 (roller length):1 (roller diameter). If $\beta$ is only slightly smaller than $\alpha$ or the deflection radius is very great, a roller length to roller diameter ratio of 1 : 1 would be conceivable. The roller length can also be shorter than the roller diameter under certain circumstances.

Figure 11A:
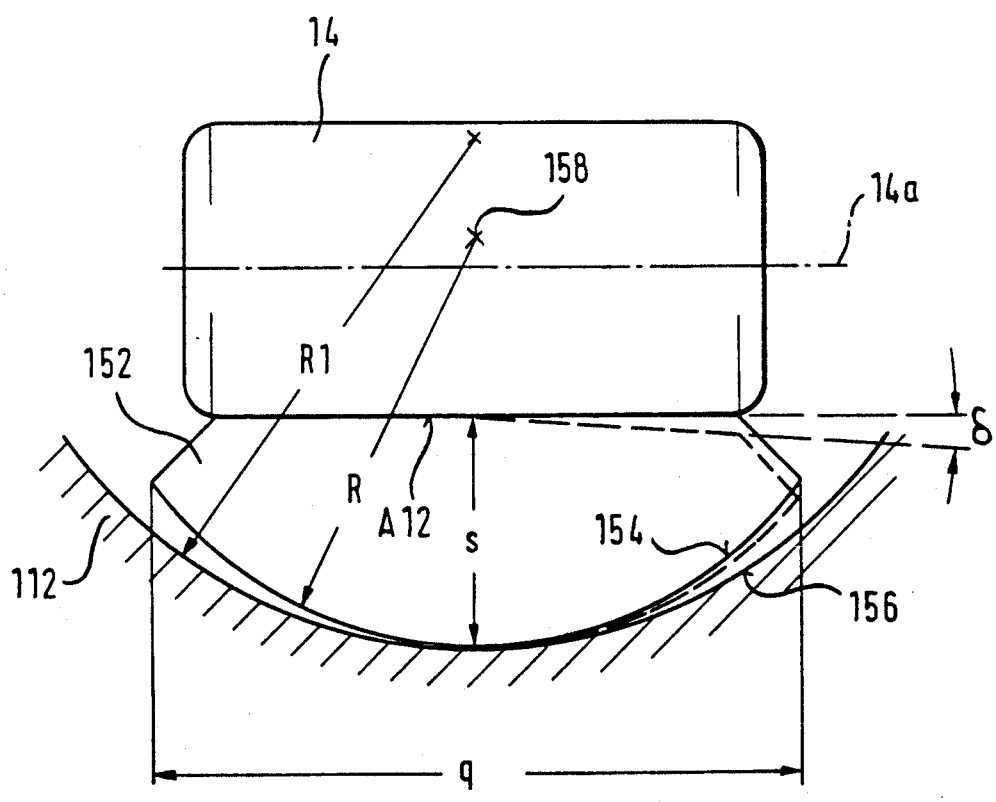
FIG. 11a shows an enlarged section through the track insert in the region of its contact face on the guide carriage.

For construction of the track insert 152, reference is now made to the enlarged sectional view according to FIG. 11a. The roller 14 in contact with the load-bearing track A12 which is formed as a plane face on the track insert 152 can again be seen therein. The track insert 152 lies with a convex bearing face 154 on the concave bearing face 156 of the guide carriage 112 The radius of curvature of the convex bearing face 154 is designated by R and the radius of curvature of the concave bearing face 156 by R1. The radius of curvature R1 is greater than the radius of curvature R. For example 1.005<R-1<1.02.

During mounting, the track insert 152 can be adjusted by swinging round the swing axis 158 such that—while observing FIG. 11—the load-bearing track A12 of the track insert 152 is exactly parallel to the load-bearing track A11 of the guide rail 110.

FIG. 11A also shows that—in the section illustrated therein—the cross section of the track insert 152 is elongate so bending of the cross section is possible such that the radius of curvature R of the convex bearing face 154 approximates to the radius of curvature R1 of the concave bearing face 156. This approximation can occur, for example, if, after assembly, the bearing is stressed, but a swinging/ sliding adaptation of the track insert 152 cannot take place due to self-locking because the convex bearing face 154 rests with friction on the concave bearing face 156 with self-locking. In this case, the bendability of the track insert 152 allows the track A12 to be placed approximately parallel to the track A11. This applies, for example, if, in FIG. 11, the guide carriage 112 spreads open under load relative to the guide rail 110.

A further advantage is associated with the elastic deformability of the track insert 152:

It is a known fact that a roller which is loaded between two plane faces rests with greater area pressure on the resting faces at its ends than in its central region. Now if the track insert 152 is elastically deformable in the sense of approximation of the radius of curvature R to the radius of curvature R1, the track A12 can yield by the angle at the ends of the roller 14 The area pressure between roller 14 and track insert 152 is therefore evened out over the entire cross-sectional length q according to FIG. 11a.

The ratio of the cross-sectional height s to the cross-sectional length q of the insert 152 is between 0.2 and 0.8, preferably between 0.25 and 0.5.

With regard to the prior art, reference should be made to DE-PS 30 34 008, where track inserts of similar cross-sectional shape are provided in a pivot bearing (see in particular FIG. 3, position 21). However, the convex bearing face of the track insert is adapted exactly in its radius of curvature to the radius of curvature of a concave bearing face of the respective pivot member.

Figure 14:
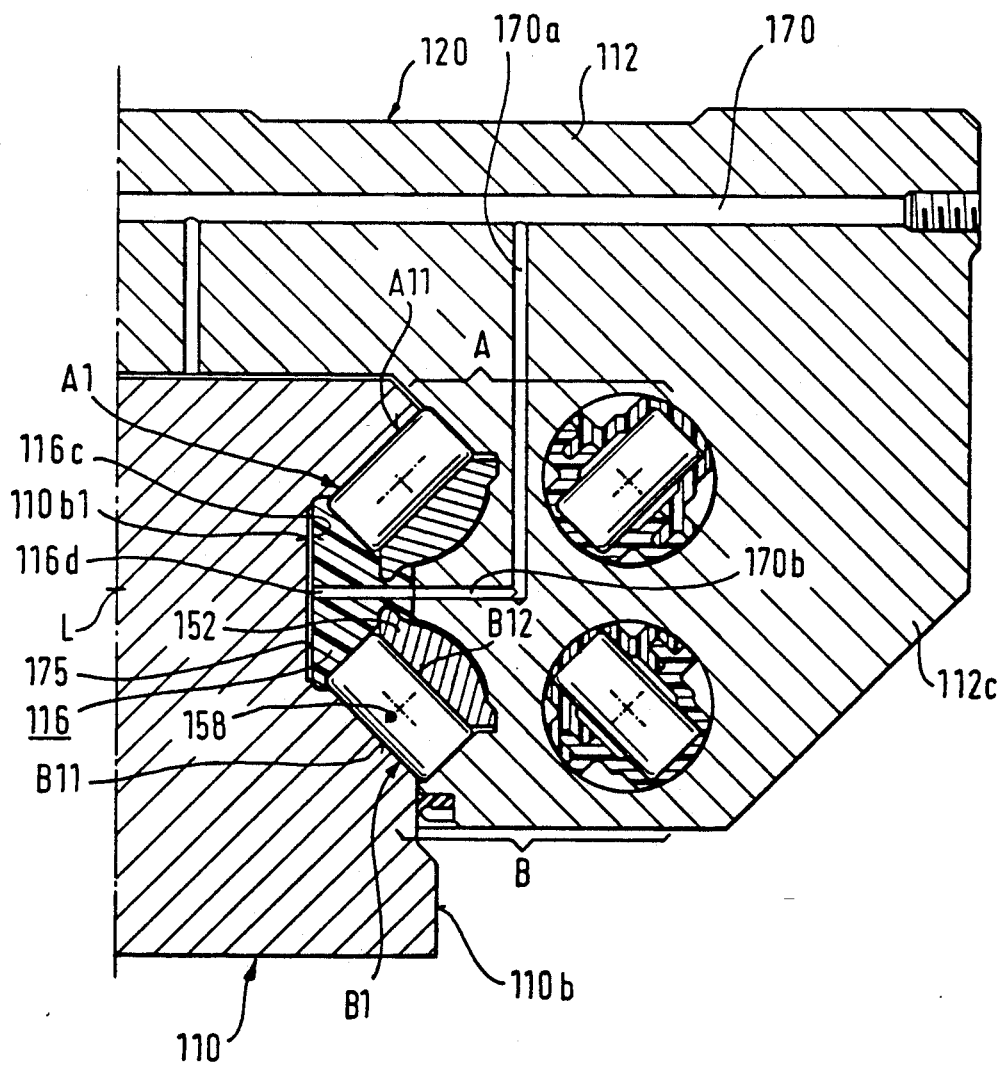
FIG. 14 shows a section through a rolling bearing corresponding to FIG. 11 in the region of the lubricant supply of lubricant cushions.

FIG. 14 again essentially shows the construction illustrated in FIG. 11. However, the section is shifted into a different plane which is in turn orthogonal to the longitudinal axis L. The supporting strip arrangement 116 which supports the rows of rollers A1 and A2 on the guide carriage 112 can again be seen there. This supporting strip arrangement 116 arranged rigidly on the guide carriage 112 has a lateral face 116c which, together with a region 110b1 of the lateral face 110b of the guide rail 110, forms a lubricant cushion 175. This lubricant cushion 175 is connected to the lubricating oil supply system 170 via ducts 170a and 170b of the main member 120 of the guide carriage 112 and a bore 116d in the supporting strip arrangement 116.

Figure 15:
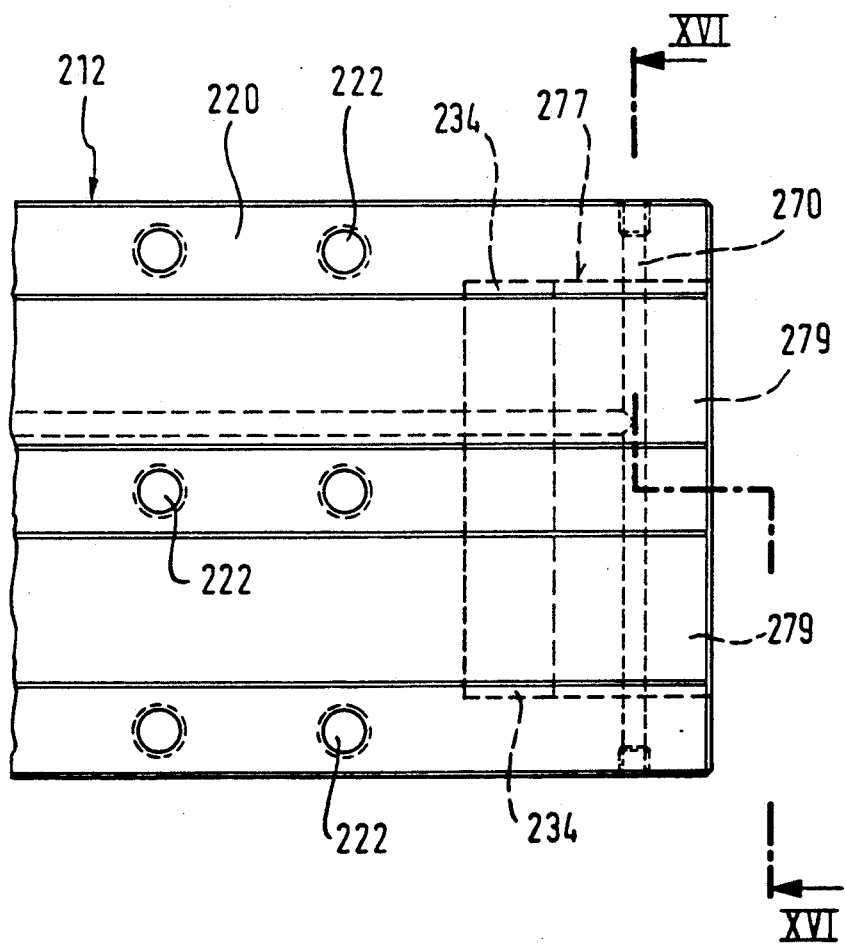
FIG. 15 shows a plan view corresponding to that in FIG. 2 of a variation with lubricant cushion-forming guide blocks.
Figure 16:
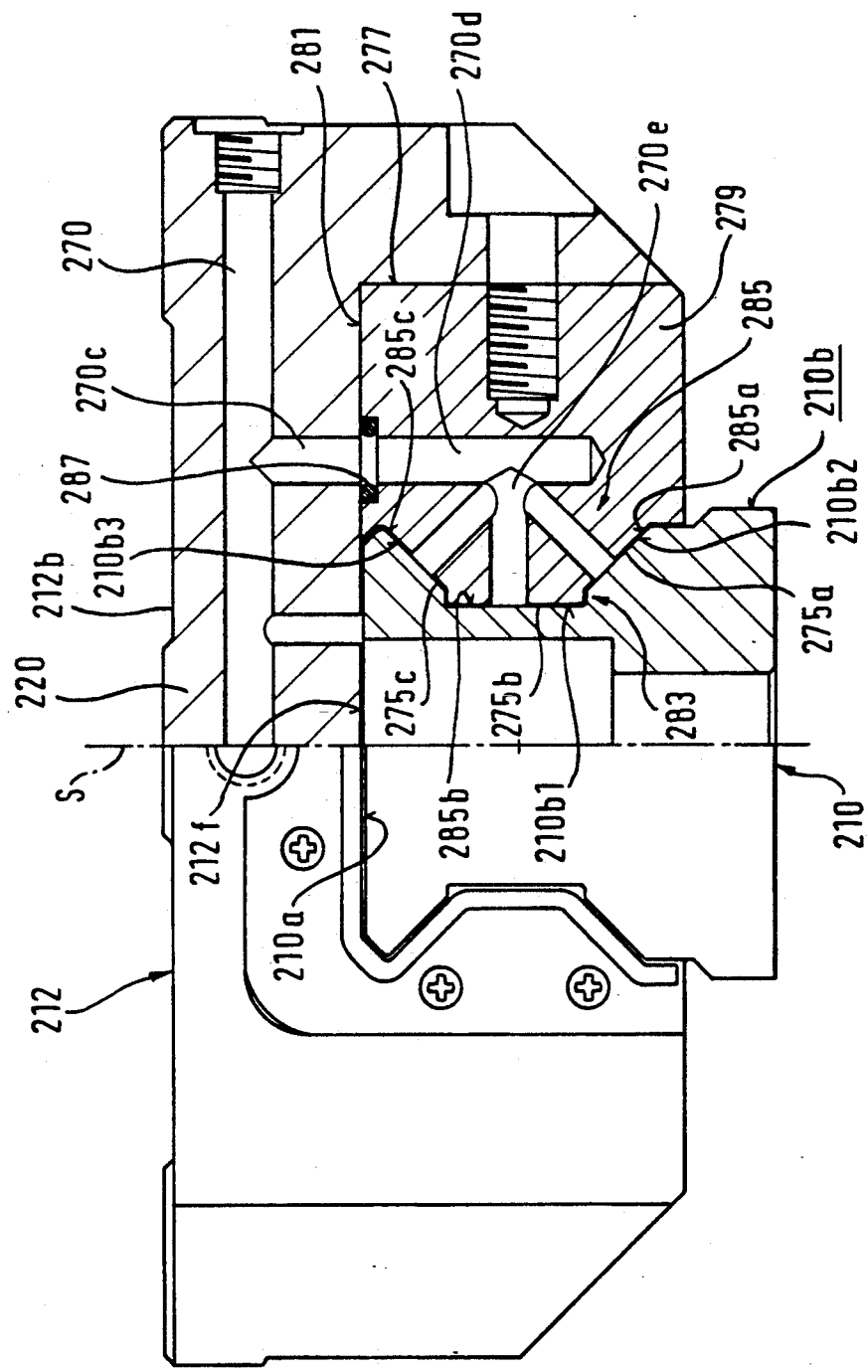
FIG. 16 shows a section along line XVI—XVI in FIG. 15.

The embodiment in FIGS. 15 and 16 is derived from the embodiment according to FIGS. 1 to 3. The main member 220 of the guide carriage 212 is designed here at its ends on both sides of the guide rail 210 with a respective receiving chamber 277 which are limited at the top by the web part 212b continued to the end of the guide carriage 212 The terminal plates 234, on the one hand, which receive the base members 24 connected to the covering members 26 as in FIGS. 2 and 3 are inserted into these chambers 277 (see FIGS. 2 and 3). In addition, a respective guide block 279 is received in each of these receiving chambers 277. As shown in FIG. 16, the guide blocks 279 rest, at the top, on chamber limiting faces 281 which lie in the same plane as the internal limiting face 212f of the web part 212b. The guide rail 210 has a trapezoidal hollow profile 283 which is formed by the face regions 210b1, 210b2 and 210b3 of the lateral face 210b. Each guide block 279 has a complementary trapezoidal profile 285 which is defined by faces 285a, 285b and 285c. The faces 210b2, 210b1, 210b3 lie on the faces 285a, 285b and 285c and define lubricant cushions 275a, 275b and 275c. These lubricant cushions 275a, 275b, 275c are supplied from the central lubricating oil supply 270 via a bore 270c in the web part 212b, a bore 270d in the guide block 279 and a freely branched bore system 270e of the guide shoe 279.

An 0-ring 287 is provided at the transition from the bore 270c to the bore 270d for sealing purposes.

It can be seen that this guide block arrangement, which can be provided on both sides of the longitudinal centre plane S and on both sides of the guide carriage 212, allows damping of oscillations in the transverse direction, in the vertical direction and also of rotary oscillations.

In all embodiments of the invention a simplified method of mounting is achieved. This is explained with reference to FIGS. 2 to 7:

At first the support strip portions 17 together with the base members 24 are mounted to the main bearing member 20 so that they are placed at the main bearing member 20 in their final operational position. In this stage, the covering members 26 are still disconnected from the base members 24. Then the rollers 14 can be inserted into the curved guides A30 of the still open base members 24 and distributed gradually over the whole length of the roller circuits.

Not until all of the rollers 14 of the roller circuits are inserted the covering members 26 are set onto the base members 24, whereby the positioning pegs 28 of the covering members 26 are pushed into the positioning holes 28a. This step is shown in FIG. 4a. In FIG. 4a an arrow 26b indicates the direction in which the covering member 26 is advanced to and placed upon the base member 24 during the final mounting. The covering members 26 can be secured at the base members 24 by a snap connection or by a screwing. Under certain circumstances it may be sufficient to position the covering members 26 at the base member 24 by the pegs 28 only and to secure them by the terminal plates 34 only, which are fixed at the main bearing member 20 by the screws 36 after the cover members 26 have been mounted at the main bearing member 20. The terminal plates 34 can keep the base member 24 and the covering member 26 together in their chambers 38.

This type of mounting is of special interest, because the rollers 14 are secured by the profiles 12e and 16b against falling out from the guide carriage so that an inserting of the rollers in the area of the load-transmitting rectilinear row of rollers A1 (see FIG. 1) is not possible or only with great difficulties. So the guide carriage can be fully completed without danger of losing the rollers 14 before the guide carriage has been mounted onto the guide rail.

Preferably the rollers 14 are in direct contact with one another without intermediate spacers.

While specific embodiments of the invention have been shown and described in detail to illustrate the application of the inventive principles, it will be understood that the invention may be embodied otherwise without departing from such principles.

The reference mumerals in the claims are only used for facilitating the understanding and are by no means restrictive.

What is claimed is:

1. Rolling bearing for linear movements, comprising a guide rail (10) with a longitudinal axis (L), two lateral faces (10b), a top face (10a) and a centre plane (S) between the two lateral faces (10b), a U-shaped guide carriage (12) with a web (12b) which extends parallel to a web plane (E-E) and opposes the top face (10a) of the guide rail (10) and with arms (12c) adjacent to the lateral faces (10b) of the guide rail (10), a plurality of rolling member circuits (A) for guiding the guide carriage (12) on the guide rail (10), wherein two rolling member circuits (A, B), namely roller circuits, are arranged on at least one side of the centre plane (S), wherein, moreover, each of the two roller circuits (A, B) is constructed from rollers (14) with a roller axis (14a), with a roller peripheral surface (14b), with axially spaced roller end faces (14c) and with a roller centre (14d) located on the roller axis (14a) in the centre between the two end faces (14c), wherein, moreover, each roller circuit (A, B) comprises a rectilinear load-transmitting row of rollers (A1, B1) in engagement with a load-bearing track (A12, B12) of the guide carriage (12) parallel to the longitudinal axis (L) of the guide rail (10) and a load-bearing track (A11, B11) of the guide rail (10) parallel to the longitudinal axis (L) of the guide rail (10), a substantially rectilinear return row of rollers (A2, B2) in a return guide (A20, B20) of the guide carriage (12) and two curved rows of rollers (A3) in curved guides (A30) of the guide carriage (12), wherein, moreover, the roller axes (14a) of all rollers (14) of each roller circuit (A, B) are arranged parallel to one another, wherein, moreover, the two roller circuits (A, B) each define a circuit plane (UA, UB) which approximately contains the centres (14d) of the rollers (14) of the load-transmitting row of rollers (A1, B1) and the return row of rollers (A2, B2) of the respective roller circuit (A, B), wherein, moreover, the rollers (14) of the respective loading-transmitting row of rollers (A1, B1) of each roller circuit (A, B) define a force-transmitting plane (KA, KB) which is perpendicular to the roller axes (14a) of the rollers (14) of the load-transmitting row of rollers (A1, B1) and contains the centres (14d) of the rollers (14) of this load-transmitting row of rollers (A1, B1), wherein, moreover, the circuit planes (UA, UB) and the force-transmitting planes (KA, KB) of the two roller circuits (A, B) are parallel to the longitudinal axis (L) of the guide rail (10), wherein, moreover, the force-transmitting planes (KA, KB) of the load-transmitting rows of rollers (A1, B1) of the two roller circuits (A, B) together enclose a first angle (α) and the circuit planes (UA, UB) of the two roller circuits (A, B) together enclose a second angle (β), wherein, moreover, the projections of the two roller circuits (A, B) do not intersect in the direction of the longitudinal axis (L), wherein, moreover, the two roller circuits (A, B) are superimposed perpendicularly to the web plane (E—E) and wherein the return rows of rollers (A2, B2) of the two roller circuits (A, B) are more remote from the centre plane (S) of the guide rail (10) than the load-transmitting rows of rollers (A1, B1) of the two roller circuits (A, B), in each of the roller circuits (A, B), the rollers (14) of the return row of rollers (A2, B2) being offset from the rollers (14) of the load-transmitting row of rollers (A1, B1) in the direction of the roller axes (14a) of the respective roller circuit (A, B) by a respective offset distance (V), successive rollers (14) of the two curved rows of rollers (A3) of the respective roller circuit (A, B) being offset from one another by respective individual offset distances in the direction of the respective roller axes (14a), the sum of said individual offset distances formed over the respective curved row of rollers corresponding to the respective offset distance (V), the offset direction of the return rows of rollers (A2, B2) relative to the load-transmitting rows of rollers (A1, B1) of the two roller circuits (A, B) being selected such that the second angle ($\beta$) is smaller than the first angle ($\alpha$).

2. Rolling bearing according to claim 1, characterised in that the angle ($\beta$) enclosed by the circuit planes (UA, UB) of the two roller circuits (A, B) is zero, in that the load-transmitting rows of rollers (A1, B1) of the two roller circuits (A, B) are superimposed in perpendicular direction to the web plane (E—E) and in that the return rows of rollers (A2, B2) of the two roller circuits (A, B) are also superimposed in perpendicular direction to the web plane (E—E).

3. Rolling bearing according to claim 1, characterised in that the two roller circuits (A, B) extend over equal lengths in the longitudinal direction of the guide carriage (12).

4. Rolling bearing according to claim 1, characterised in that the force transmission planes (KA, KB) of the load-transmitting rows of rollers (A1, B1) of the two C roller circuits (A, B) enclose a first angle ($\alpha$) of about 90° with one another.

5. Rolling bearing according to claim 1, characterised in that two roller circuits (A, B) are arranged on each side of centre plane (S).

6. Rolling bearing according to claim 1, characterised in that the roller circuits (A, B) are arranged substantially symmetrically to one another with respect to the centre plane (S) on either side of the centre plane (S).

7. Rolling bearing according to claim 1, characterised in that the curved guide (A30) of one curved row of rollers (A3) is provided with at least one internal curved roller track (A 32) for engagement with the roller peripheral surfaces (14b) of this curved row of rollers (A3), with
at least one external curved roller track (A31) for engagement with the roller peripheral surfaces (14b) of this curved row of rollers (A3) and with two curved roller support webs (A33, A34) opposing said roller end faces (14c) of this curved row of rollers (A3), in that the return guide (A20) of the associated return row of rollers (A2) is provided with at least one internal return roller track (A22) for engagement with the roller peripheral surfaces (14b) of this return row of rollers (A2), with
at least one external return roller track (A21) for engagement with the roller peripheral surfaces (14b) of this return row of rollers (A2) and with return roller support webs (A23, A24) opposing said roller end faces (14c) of this return row of rollers (A2), in that the roller end faces (14c) of the associated load-transmitting row of rollers (A1) are opposite to load roller support webs (A13, A14),
in that the internal curved roller track (A32) joins the load-bearing track (A12) of the guide carriage (12) and the internal return roller track (A22),
in that the external curved roller track (A31) joins the load-bearing track (A11) of the guide rail (10) and the external return roller track (A21) and
in that each of the curved roller support webs (A33, A34) joins one of a return roller support web (A23, A24) and one of a load roller support web (A13, A14).

8. Rolling bearing according to claim 7, characterised in that at least one rectilinear load-transmitting row of rollers (A1) and the associated substantially rectilinear return row of rollers (A2) are arranged in a main member unit (20) of the guide carriage (12) and in that at least one associated curved guide (A30) is formed in one end unit (50) of the guide carriage (12), wherein the end unit (50) has a base member (24) and a covering member (26) and wherein one curved roller support web (A34) of the curved roller support webs (A33, A34) and at least part of the curved roller tracks (A31, A32) are formed in the base member (24) and wherein at least the second curved roller support web (A33) is formed on the covering member (26).

9. Rolling bearing according to claim 8, characterised in that a base member (24) of the end unit (50) is common to two curved guides (A30, B30) and in that a covering member (26) is fixed on the common base member (24) for each curved guide (A30, B30).

10. Rolling bearing according to claim 9, characterised in that the base member (24) and the two covering members (26) embraced by a terminal plate (34) mounted on the main member unit (20) of the guide carriage (12) at one end of the main member unit (20).

11. Rolling bearing according to claim 10, characterised in that the terminal plate (34) is common to one respective base member (24) and two associated covering members (26) on both sides of the centre plane (S).

12. Rolling bearing according to claim 10, characterised in that a sealing plate (44) adapted to the profile of the guide rail (10) is mounted on the terminal plate (34).

13. Rolling bearing according to claim 12, characterised in that sealing plates (44) mounted at the two ends of the guide carriage (12) follow a respective longitudinal sealing strip (48) of the guide carriage (12) on both lateral faces (10b) of the guide rail (10).

14. Rolling bearing according to claim 7, characterised in that at least one of the load roller support webs (A13, A14) embraces the peripheral surfaces (14b) of the rollers (14) of a load-transmitting row of rollers (A1) such that the rollers (14) of the load-transmitting row of rollers (A1) are permanently secured on the guide carriage (12) when the guide rail (10) and guide carriage (12) are separated.

15. Rolling bearing according to claim 7, characterised in that mutually adjacent load roller support webs (A14, B14) of two roller circuits (A, B) are formed by a support strip arrangement (16) common to them.

16. Rolling bearing according to claim 1, characterised in that at least one rectilinear load-transmitting row of rollers (A1) and the associated substantially rectilinear return row of rollers (A2) are arranged in a main member unit (20) of the guide carriage (12) and in that at least one associated curved guide (A30) is formed in one end unit (50) of the guide carriage (12).

17. Rolling bearing according to claim 16, characterised in that the end unit (50) is connected to the main member unit (20) in a parting plane (30) substantially perpendicular to the longitudinal axis (L).

18. Rolling bearing according to claim 16, characterised in that transition support web portions (A43, A44) tangentially follow the curved roller support webs (A33, A34), these transition support web portions (A43, A44) tangentially following the associated return roller support webs (A23, A24) and the associated load roller support webs (A13, A14) and being arranged inside the end unit (50).

19. Rolling bearing according to claim 16, characterised in that mutually adjacent load roller support webs (A14, B14) of two roller circuits (A, B) are formed by a support strip arrangement (16) common to them and in that this support strip arrangement (16) is formed by two support strips (17) divided in the longitudinal centre of the main member unit (20), each of which is produced integrally with a part (24) of an end unit (50).

20. Rolling bearing according to claim 1, characterised in that the load-bearing track (A12) of at least one roller circuit (A) is formed by an insert (152) in the guide carriage (112).

21. Rolling bearing according to claim 20, characterised in that the insert (152) is mounted at the guide carriage (112) in a swinging manner round a swinging axis (158) parallel to the longitudinal axis of the guide rail (110).

22. Rolling bearing according to claim 21, characterised in that the insert (152) provides a convex bearing face (154) engaging with a concave bearing face (156) of the guide carriage (112).

23. Rolling bearing according to claim 22, characterised that the convex bearing face (154) has a smaller radius of curvature than the concave bearing face (156).

24. Rolling bearing according to claim 20, characterised in that the insert (152) engages at least at one end in a recess (160) in an end unit of the guide carriage (112) mounted at the end of a main member unit of the guide carriage (112).

25. Rolling bearing according to claim 1, characterised in that at least one return guide (A20) is formed by a cylindrical bore (A29) of the guide carriage (12), which cylindrical bore (A29) is widened by substantially rectangular niches (A28), wherein the diameter of the bore (A29) is greater than the diameter of the rollers (14) and smaller than the axial length of the rollers (14) and wherein the niches (A28) engage the end faces (14c) of the rollers (14) and the end sections of the peripheral surfaces (14b) of the rollers (14).

26. Rolling bearing according to claim 25, characterised in that, when constructing the guide carriage (12) with a main member unit (20) and an end unit (50) having a curved guide (A30), the end unit (50) is provided, in one end region of the curved guide (A30), with circular segment-shaped projections (40) which engage in a bore (A29) of the guide carriage (12) forming at least one return guide (A20).

27. Rolling bearing according to claim 1, characterised in that at least one return guide (A20) is formed by a guide lining (162) in a duct (A29) of the guide carriage (112).

28. Rolling bearing according to claim 27, characterised in that the duct (A29) is formed by a circular cylindrical bore.

29. Rolling bearing according to claim 27, characterized in that, when constructing the guide carriage (112) with a main member unit and at least one end unit mounted at an axial end of the main member unit, at least a part (162a) of the guide lining is integral with a part (124) of an end unit.

30. Rolling bearing according to claim 27, characterised in that the guide lining (162) is divided in the longitudinal direction.

31. Rolling bearing according to claim 1, characterised in that a lubricant cushion (72), in particular an oil cushion (72), is provided between at least one of the top face (10a) and the lateral faces (10b) of the guide rail (10), on the one hand, and a face (12f) of the guide carriage (12) opposing it at a short distance, on the other hand.

32. Rolling bearing according to claim 31, characterised in that the lubricant cushion (72) which also serves to supply lubricant to supply system (70) which also serves to supply lubricant to at least one roller circuit (A).

33. Rolling bearing according to claim 32, characterised in that the lubricant supply system (70) possesses a plurality of lubricant connections (81a to 80e) which can be attached selectively to an external lubricant source.

34. Rolling bearing according to claim 1, characterised in that the load-bearing tracks (A11, B11) of two roller circuits (A, B) coverage on one side of the guide rail (10) toward the centre plane (S) of the guide rail (10) when viewed in a cross section perpendicular to the longitudinal axis (L).

35. Rolling bearing according to claim 1, characterised in that the load-bearing tracks (C11, D11) of two roller circuits diverge on one side of the guide rail (10) toward the centre plane (S) of the guide rail (10) when viewed in a cross section perpendicular to the longitudinal axis.

36. Rolling bearing for linear movements, comprising a guide rail (10) with a longitudinal axis (L) and a guide carriage (12) as well as at least one rolling member circuit (A) for guiding the guide carriage (12) on the guide rail (10), wherein the rolling member circuit (A), of which there is at least one, comprises a rectilinear load-transmitting row of rolling members (A1) in engagement with aload-bearing track (A12) of the guide carriage (12) parallel to the longitudinal axis (L) of the guide rail (10) and a load-receiving track (A11) of the guide rail (10) parallel to the longitudinal axis (L) of the guide rail (10), a substantially rectilinear return row of rolling members (A2) in a return guide (A20) of the guide carriage (12) and two curved rows of rolling members (A3) in curved guides (A30) of the guide carriage (12) and wherein the oscillations of the guide carriage (12) are damped relative to the guide rail (10) by at least one lubricant cushion (72, 74), characterised in that the lubricant cushion (72, 74) is arranged between the guide carriage (12) itself and the guide rail (10).

37. Rolling bearing according to claim 36, characterised in that the lubricant cushion (72, 74) is a lubricating oil cushion.

38. Rolling bearing according to claim 36, characterised in that the lubricant cushion (72, 74) is constructed between faces (10a, 12f) which are spaced about 5 μ to about 100 μ apart.

39. Rolling bearing according to claim 36, characterised in that the lubricant of the lubricant cushion (72, 74) is under pressure.

40. Rolling bearing according to claim 36, characterised in that the lubricant of the lubricant cushion (72, 74) is provided by a lubricant supply system (70) which also serves to supply the rolling member circuit (A), of which there is at least one, with lubricant.

41. Rolling bearing according to claim 36, characterised in that with a U-shaped design of the guide carriage (12) with a web part (12b) opposing a top face (10a) of the guide rail (10) and two arm parts (12c) each opposing a lateral face (10b) of the guide rail (10), the lubricant cushion (72, 74) is provided between at least one of the pairs of top face (10a) - web part (12b) and lateral face (10b) - arm part (12c).

42. Rolling bearing according to claim 41, characterised in that lubricant cushions (72, 74) are provided between the top face (10a) of the guide rail (10) and an internal face (12f), opposing the top face (10a), of the web part (12b) and also between opposing oblique faces of the guide rail (10) and the web part (12b) adjacent to the top face (10a) or the internal face (12f).

43. Rolling bearing according to claim 41, characterised in that, in the presence of two rolling member circuits (A, B) in at least one arm part (112c) of the U-shaped guide carriage (112) with two load-transmitting rows of rolling members (A1, B1) associated with a rolling member circuit (A, B) in each case, a lubricant cushion (175) is formed between the load-transmitting rows of rolling members (A1, B1) by the guide rail (110) and a part (116) of the guide carriage (112).

44. Rolling bearing according to claim 43, characterised in that a lubricant cushion (175) is formed between the guide rail (110) and a support strip arrangement (116) which serves to support the load-transmitting rows of rolling members (A1, B1) on the guide carriage (112).

45. Rolling bearing according to claim 41, characterised in that on the U-shaped guide carriage (212), more specifically in its end regions located outside the rolling member circuits, there are mounted guide blocks (279) which, together with the lateral faces (210b) of the guide rail (210) form at least one lubricant cushion (275a, 275b, 275c) in each case.

46. Rolling bearing according to claim 45, characterised in that with the design of a lateral face (210b) of the guide rail (210) with a trapezoidal profile (283), the guide block (279) has a complementary trapezoidal profile (285) and in that lubricant cushions (275a, 275b, 275c) are constructed between each three limiting faces (210b2, 210b1, 210b3; 285a, 285b, 285c) of the two trapezoidal profiles (283, 285).

47. Rolling bearing according to claim 45, characterised in that the guide blocks (279) are arranged inside a main member (220) of the guide carriage (212) in recesses (277) in this main member (220).

48. Rolling bearing according to claim 47, characterised in that the guide blocks (279) rest inside their recesses (277) on limiting faces (281) of these recesses (277) which are flush with an internal face (212f) of the web part (212b) opposing the top face (210a) of the guide rail (210).

49. Rolling bearing for linear movements comprising a guide rail (10) with a longitudinal axis (L) and a guide carriage (12) as well as at least one roller circuit (A) for guiding the guide carriage (12) on the guide rail (10), wherein the roller circuit (A), of which there is at least one, comprises a rectilinear load-transmitting row of rollers (A1) in engagement with a load-bearing track (A12) of the guide carriage (12) parallel to the longitudinal axis (L) of the guide rail (10) and a load-bearing track (A11) of the guide rail (10) parallel to the longitudinal axis (L) of the guide rail (10), a substantially rectilinear return row of rollers (A2) in a return guide of the guide carriage (12), wherein, moreover, the guide carriage (12) has a main member unit (20) with the return guide (A20) and end units (50) with the curved guides (A30), wherein, moreover, the return guide (A20) is formed by a cylindrical bore (A29) which is substantially parallel to the longitudinal axis (L) of the guide rail (10) and in whose peripheral surface niches (A28) are worked for receiving the roller contour, characterised in that the cylindrical bore (A29) is constructed with a diameter which is greater than the roller diameter and smaller than the axial roller length and in that substantially rectangular niches (A28) opposing the end faces (14c) of the rollers (14) and end portions of peripheral faces (14b) of the rollers (14) are provided in the cylindrical bore (A29) in two diametrally opposed peripheral regions.

50. Rolling bearing for linear movements, comprising a guide rail (10) with a longitudinal axis (L), two lateral faces (10b), a top face (10a) and a centre plane (S) between the two lateral faces (10b), a U-shaped guide carriage (12) with a web (12b) which extends parallel to a web plane (E-E) and opposes the top face (10a) of the guide rail (10) and with arms (12c) adjacent to the lateral faces (10b) of the guide rail (10), a plurality of rolling member circuits for guiding the guide carriage (12) on the guide rail (10), wherein two rolling member circuits (A, B), namely roller circuits, are arranged on at least one side of the centre plane (S), wherein, moreover, each of the two roller circuits (A, B) is constructed from rollers (14) with a roller axis (14a), with a roller peripheral surface (14b), with axially spaced roller end faces (14c) and with a roller centre (14d) located on the roller axis (14a) in the centre between the two end faces (14c), wherein, moreover, each roller circuit (A, B) comprises a rectilinear load-transmitting row of rollers (A1, B1) in engagement with a load-bearing track (A12, B12) of the guide carriage (12) parallel to the longitudinal axis (L) of the guide rail (10) and a load-bearing track (A11, B11) of the guide rail (10) parallel to the longitudinal axis (L) of the guide rail (10), a substantially rectilinear return row of rollers (A2, B2) in a return guide (A20, B20) of the guide carriage (12) and two curved rows of rollers (A3) in curved guides (A30) of the guide carriage (12), wherein, moreover, the roller axes (14a) of all rollers (14) of each roller circuit (A, B) are arranged parallel to one another, wherein, moreover, the two roller circuits (A, B) each define a circuit plane (UA, UB) which approximately contains the centres (14d) of the rollers (14) of the load-transmitting row of rollers (A1, B1) and the return row of rollers (A2, B2) of the respective roller circuit (A, B), wherein, moreover, the rollers (14) of the respective loading-transmitting row of rollers (A1, B1) of each roller circuit (A, B) define a force-transmitting plane (KA, KB) which is perpendicular to the roller axes (14a) of the rollers (14) of the load-transmitting row of rollers (A1, B1) and contains the centres (14d) of the rollers (14) of this load-transmitting row of rollers (A1, B1), wherein, moreover, the circuit planes (UA, UB)

and the force-transmitting planes (KA, KB) of the two roller circuits (A, B) are parallel to the longitudinal axis (L) of the guide rail (10), wherein, moreover, the force-transmitting planes (KA, KB) of the load-transmitting rows of rollers (A1, B1) of the two roller circuits (A, B) together enclose a first angle ($\alpha$) and the circuit planes (UA, UB) of the two roller circuits (A, B) together enclose a second angle ($\beta$), wherein, moreover, the projections of the two roller circuits (A, B) do not intersect in the direction of the longitudinal axis (L), wherein, moreover, the two roller circuits (A, B) are superimposed perpendicularly to the web plane (E—E) and wherein the return rows of rollers (A2, B2) of the two roller circuits (A, B) are more remote from the centre plane (S) of the guide rail (10) than the load-transmitting rows of rollers (A1, B1) of the two roller circuits (A, B), in each of the roller circuits (A, B), the rollers (14) of the return row of rollers (A2, B2) being offset from the rollers (14) of the load-transmitting row of rollers (A1, B1) in the direction of the roller axes (14a) of the respective roller circuit (A, B) by a respective offset distance (V), successive rollers (14) of the two curved rows of rollers (A3) of the respective roller circuit (A, B) being offset from one another by respective individual offset distances in the direction of the respective roller axes (14a), the sum of the individual offset distances formed over the respective curved row of rollers corresponding to the respective offset distance (V), the offset direction of the return rows of rollers (A2, B2) relative to the load-transmitting rows of rollers (A1, B1) of the two roller circuits (A, B) being selected such that the second angle ($\beta$) is smaller than the first angle ($\alpha$), the curved guide (A30) of one curved row of rollers (A3) being provided with at least one internal curved roller track (A32) for engagement with the roller peripheral surfaces (14b) of this curved row of rollers (A3), with at least one external curved roller track (A31) for engagement with the roller peripheral surfaces (14b) of this curved row of rollers (A3) and with two curved roller support webs (A33, A34) opposing said roller end faces (14c) of this curved row of rollers (A3), the return guide (A20) of the associated return row of rollers (A2) being provided with at least one internal return roller track (A22) for engagement with the roller peripheral surfaces (14b) of this return row of rollers (A2), with at least one external return roller track (A21) for engagement with the roller peripheral surfaces (14b) of this return row of rollers (A2) and with return roller support webs (A23, A24) opposing said roller end faces (14c) of this return row of rollers (A2), the roller end faces (14c) of the associated load-transmitting row of rollers (A1) being opposite to load roller support webs (A13, A14), the internal curved roller track (A32) joining the load-bearing track (A12) of the guide carriage (12) and the internal return roller track (A22), the external curved roller track (A31) joining the load-bearing track (A11) of the guide rail (10) and the external return roller track (A21), each of the curved roller support webs (A33, A34) joining one of a return roller support web (A 23, A24) and one of a load roller support web (A13, A14), the rectilinear load-transmitting rows of rollers (A1, B1) and the associated substantially rectilinear return rows of rollers (A2, B2) on one side of the centre plane (S) being arranged in a main member unit (20) of the guide carriage (12), the associated curved guides (A30, B30) being formed in end units (50) of the guide carriage (12), one end unit (50) having a base member (24) common for two curved guides (A30, B30)m one curved roller support web (A34) and the curved roller tracks (A31, A32) for each of the curved guides (A30, B30) being provided in the base member (24) and one respective covering member (26) with a second curved roller support web (A33, B30) being fixed at the common base member (24).

51. Rolling bearing according to claim 50, characterized in that mutually adjacent load roller support webs (A14, B14) of the two roller circuits (A, B) on one side of the centre plane (S) are formed by a support strip arrangement (16) common to them and in that this support strip arrangement (16) is formed by two support strips (17) divided in the longitudinal centre of the main member unit (20), each of which is produced integrally with one base member (24).

52. Rolling bearing according to claim 51, characterised in that the covering members (26) rest on the base member (24) in abutment faces (26a) parallel to the longitudinal axis (L) and are mountable in a direction (26b) perpendicular to the longitudinal axis (L), when the base member (24) with the associated support strip (17) is mounted in operational position at the main member unit (20).

53. Rolling bearing according to claim 50, characterised in that at least one of the load roller support webs (A13, A14) embraces the peripheral surfaces (14b) of the rollers (14) of a load-transmitting row of rollers (A1) such that the rollers (14) of the load-transmitting row of rollers (A1) are permanently secured on the guide carriage (12) when the guide rail (10) and guide carriage (12) are separated.

54. Rolling bearing according to claim 50, characterised in that the base member (24) and the two covering members (26) are embraced by a terminal plate (34) mounted on the main member unit (20) of the guide carriage (12) at one end of the main member unit (20).

55. Rolling bearing according to claim 54, characterised in that the terminal plate (34) is common to respective base members (24) and respective two associated covering members (26) on both sides of the centre plane (S).

56. Rolling bearing according to claim 1, comprising a guide rail (110) with a longitudinal axis and a guide carriage (112) as well as at least one roller circuit (A) for guiding the guide carriage (112) on the guide rail (110), wherein the roller circuit (A), of which there is at least one, comprises a rectilinear load-transmitting row of rollers (A1) in engagement with a load-bearing track (A12) of the guide carriage (112) parallel to the longitudinal axis of the guide rail (110) and a load-bearing track (A11) of the guide rail (110) and a load-bearing track (A11) of the guide rail (110) parallel to the longitudinal axis of the guide rail (110), a substantially rectilinear return row of rollers (A2) in a return guide (A20) of the guide carriage (112) and two curved rows of rollers (A3) in curved guides (A30) of the guide carriage (112), the return guide (112) being formed by a duct (A29) which is substantially and end units with the curved guides (A30), the return guide (A20) being formed by a duct (A29) which is substantially parallel to the longitudinal axis of the guide rail (110) and has a guide lining (162) with an internal cross section adapted to the roller contour, characterised in that the internal lining (162) is constructed at least in part integrally with a base member (124) of an end unit in which at least part of the curved guide (A30) is constructed.

57. Rolling bearing according to claim 56, characterised in that the guide lining (162) is composed of two partial shells (162a, 162b) which abut in parting planes parallel to the longitudinal axis of the guide rail (110).

58. Rolling bearing according to claim 56, characterised in that the guide lining (162) is divided approximately in the longitudinal center of the bearing main member and in that the two portions, formed in this way, of the guide lining are integrally constructed at least in part with a respective base member (124) of the two end units.

59. Rolling bearing according to claim 58, characterised in that the base members (124) of the two end units are constructed with a respective partial shell (162a) corresponding to half the length of the main member unit and in that a further partial shell (162b) corresponding to the complete length of the main member unit is assembled with the two partial shells (162a) mounted on the base members (124) to form the guide lining (162).

60. Rolling bearing according to claim 1, comprising a guide rail (110) with a longitudinal axis (L) and a guide carriage (112) as well as at least one roller circuit (A) for guiding the guide carriage (112) on the guide rail (110), wherein the roller circuit (A) of which there is at least one comprises a rectilinear load-transmitting row of rollers (A1) in engagement with a load-bearing track (A12) of the guide carriage (112) parallel to the longitudinal axis (L) of the guide rail (110) and a load-bearing track (A11) of the guide rail (110) which is parallel to the longitudinal axis (L) of the guide rail (110), a substantially rectilinear return row of rollers (A2) in a return guide (A20) of the guide carriage (112) and two curved rows of rollers (A3) in curved guides (A30) of the guide carriage (112), characterised in that the load-bearing track (12) of at least one roller circuit (A) is formed by an insert (152) in the guide carriage (112), which is mounted in a swinging manner round a swinging axis (158) parallel to the longitudinal axis (L) of the guide rail (110) on the guide carriage (112), wherein the insert (152) has a convex bearing face (154) which engages in a concave bearing face (156) of the guide carriage (112) and wherein the radius of curvature (R) of the convex bearing face (154) is smaller than the radius of curvature (R1) of the concave bearing face (156).

61. Rolling bearing according to claim 60, characterised in that the ratio (R1/R) of the radius of curvature (R1) of the concave bearing face (156) to the radius of curvature (R) of the convex bearing face (154) is greater than 1.005 and smaller than 1.02.

62. Rolling bearing according to claim 60, characterised in that the cross section of the insert (152) in the direction of the roller axes is elongate and flexible in the sense that the radius of curvature (R) of the convex bearing face (154) can approach the radius of curvature (R1) of the concave bearing face (156) under load.

63. Rolling bearing according to claim 60, characterised in that the cross-sectional ratio s: q is between 0.2 and 0.8.

64. Rolling bearing according to claim 63, in which the cross-sectional ration s:q is between 0.25 and 0.5.

* * * * *

UNITED STATES PATENT AND TRADEMARK OFFICE
CERTIFICATE OF CORRECTION

PATENT NO. : 5,161,896
DATED : November 10, 1992
INVENTOR(S) : Rainer Höfling et al.

It is certified that error appears in the above-identified patent and that said Letters Patent is hereby corrected as shown below:

On the title page: Item [56]
"Wwerkzeugmaschinenbau" should read
--Werkzeugmaschinenbau--.

<u>Col. 10, line 24</u>, "8" should read --B--;

<u>Col. 14, lines 9-10</u>, "1.005<R-1<1.02" should read
-- $1.005 < \frac{R1}{1} < 1.02$ --.

<u>Col. 14, line 40</u>, "angle" should read --angle $\delta$--;

<u>Col. 17, line 41</u>, "two C" should read --two--;

<u>Col. 18, line 38</u>, "(26)" should read --(26) are--.

<u>Col. 20, lines 21-22</u>, "which also serves to supply lubricant to" should read --is attached to a lubricant--;

<u>Col. 20, line 27</u>, "81a" should read --80a--;

<u>Col. 20, line 32</u>, "coverage" should read --converge--;

<u>Col. 20, line 50</u>, "aload" should read --a load--;

<u>Col. 24, line 1</u>, "B30)m" shoudl read --B30), --;

<u>Col. 24, line 6</u>, "(A33, B30) should read --(A33) for each of the curved guides (A30, B30)--;

Col. 14, line 40, insert --.--after 14.

UNITED STATES PATENT AND TRADEMARK OFFICE
CERTIFICATE OF CORRECTION

PATENT NO. : 5,161,896
DATED : November 10, 1992
INVENTOR(S) : Rainer Höfling et al.

It is certified that error appears in the above-identified patent and that said Letters Patent is hereby corrected as shown below:

Col. 24, lines 53-54, delete "and a load-bearing track (A11) of the guide rail (110)";

Col. 24, lines 59-60, "the return guide (112) being formed by a duct (A29) which is substantially" should read --the guide carriage (112) having a main member united with the return guide (A20)--; and Col. 26, line 4, "(12)" should read --(A12)--.

Signed and Sealed this

Twenty-seventh Day of August, 1996

Attest:

BRUCE LEHMAN

Attesting Officer

Commissioner of Patents and Trademarks